United States Patent [19]
Hetzler et al.

[11] Patent Number: 6,137,644
[45] Date of Patent: Oct. 24, 2000

[54] METHOD FOR ADAPTIVE FORMATTING AND TRACK TRAVERSAL IN DATA STORAGE DEVICES

[75] Inventors: Steven R. Hetzler, Los Altos; Prakash Kasiraj; Richard M. H. New, both of San Jose, all of Calif.

[73] Assignee: International Business Machines Corporation, Armonk, N.Y.

[21] Appl. No.: 09/081,735

[22] Filed: May 19, 1998

[51] Int. Cl.[7] ........................................... G11B 5/09
[52] U.S. Cl. ................................................. 360/48
[58] Field of Search .................... 360/48, 78.08, 360/53, 31; 324/212, 226

[56] References Cited

U.S. PATENT DOCUMENTS

| | | | |
|---|---|---|---|
| 4,750,059 | 6/1988 | Syracuse | 360/73.03 X |
| 4,780,866 | 10/1988 | Syracuse | 360/73.03 X |
| 5,087,992 | 2/1992 | Dahandeh et al. | |
| 5,202,799 | 4/1993 | Hetzler et al. | 360/48 |
| 5,392,295 | 2/1995 | Coker et al. | 714/719 |
| 5,430,581 | 7/1995 | Moribe et al. | |
| 5,537,264 | 7/1996 | Pinteric | |
| 5,596,458 | 1/1997 | Emo et al. | |

Primary Examiner—Alan T. Faber
Attorney, Agent, or Firm—Lumen Intellectual Property Services

[57] ABSTRACT

A method for adaptively formatting the multiple surfaces of data storage devices such as hard drives. The method ensures that all the drives have the same total data capacity and that the capacity in each data rate is the same from drive to drive. The method includes the step of dividing the data surfaces into warm and cold surfaces using a surface quality measurement. All cold surfaces are formatted with a predetermined cold format and all warm surfaces are formatted with a predetermined warm format. The cold and warm formats have different data capacities by means of different zone layouts, a different number of error correction code bytes per data block, or different track pitches. A second embodiment uses one of three different formats for each surface: cold, nominal, or hot. The cold and hot formats are designed to be mutually compensating in terms of data capacity and each drive has an equal number of cold and hot surfaces. Therefore, each drive has a total data capacity equal to a drive having only nominally formatted surfaces. Preferably, one surface is formatted cold, and one surface is formatted hot, with the rest formatted according to a nominal format. Also disclosed is a method of traversing the tracks of a drive formatted according to the invention. The traversal method uses cylinder access mode or zone access mode traversal for each group of like-formatted surfaces, thus minimizing seek times.

34 Claims, 18 Drawing Sheets

Yield versus number of cold heads in a 20 surface drive

METHOD FOR ADAPTIVE FORMATTING AND TRACK TRAVERSAL IN DATA STORAGE DEVICES

FIELD OF THE INVENTION

This invention relates generally to magnetic data storage devices such as hard drives. More specifically, it relates to improved methods of adaptively formatting and traversing the data tracks on hard drive surfaces to compensate for variations in read/write heads and surface quality.

BACKGROUND OF THE INVENTION

Magnetic data storage devices are commonly used in computers and network servers to store large quantities of digital information. Hard drives used in computers are a good example. Most such data storage devices have a number of flat, round rotating disks, and each disk has 2 surfaces which are coated with magnetic material. A read/write head is held in close proximity to each surface, enabling data to be transferred to and from the magnetic material. All the disks rotate at the same predetermined speed. The linear velocity of the magnetic material at the outer edge of the disks is greater than the linear velocity closer to the axis of rotation. This difference in linear velocities requires that each disk be divided into different zones arranged concentrically on the surface of each disk. Each zone has a different data rate at which data is read and written.

FIG. 1 illustrates the zoning scheme commonly used in magnetic data storage devices. A disk surface 20 is divided into concentric, circular zones (labeled 1–4) where a given zone has a number of individual data tracks 21. The zones are separated by zone boundaries 22. Each track in a given zone can be written to or read from at a certain data rate. Zones located nearer the periphery of the data surface have a higher data rate than the zones closer to the rotation axis. This feature results in the linear data density (the bits-per-inch, or BPI) for any given track being relatively constant over the entire surface of the disk. This maximizes the amount of data which can be stored on the disk.

In most disk drives, a computer accesses data in blocks of a fixed size (usually 512 bytes). When the computer sends a block of data to the drive, some error correction code or error detection bytes (ECC bytes) are usually added to the data block before the block is written onto the disk drive. Each data block has its own unique set of ECC bytes. ECC bytes can be used to detect or correct for errors when data is being read from the disk drive. Generally, more ECC bytes per data block results in lower error rates at the expense of data capacity.

Every disk surface and associated read/write head has a maximum data density (bits per square inch) which can be reliably stored and retrieved. This maximum data density is determined by the unique characteristics of a given disk surface/head pair. The maximum data density can be translated into a maximum data rate as a function of radial position 24. This is illustrated in the graph of FIG. 1. Some disk/head pairs are able to store data at a higher density than others due to variations in manufacturing processes. Attempting to store data at a higher density than what is possible on a disk surface results in high error rates during retrieval. If the data rates 26 in any of the zones exceeds the maximum data rate curve 24 for the disk, errors will be unacceptably high.

A typical hard drive has anywhere between 2–20 disk surfaces (1–10 disks). Since there exists a variation in the data capacity of each disk surface, more data can be stored more reliably if the data density stored on each surface is adjusted to be commensurate with the maximum data density of that surface. Disk surfaces capable of high data density ('warm' surfaces) store more data than surfaces not capable of high data density ('cold' surfaces). This is the general idea behind adaptive formatting of magnetic data storage devices. In the graph of FIG. 1, a warm surface will have a higher maximum data rate curve 24, and a cold surface will have a lower maximum data rate curve 24.

One way of changing the data capacity per surface is to displace the zone boundaries 22. Moving one or more zone boundaries 22 toward the rotation axis increases the amount of data stored on the surface, and moving one or more zone boundaries 22 away from the rotation axis will decrease the data stored. Altering the zone layout is just one is method of varying the data capacity of a data surface. Several other techniques are also known in the art.

FIG. 2 shows a side view of an adaptively formatted disk drive with 6 surfaces. The capacity of each surface is varied by changing only the zone layout (zone boundary locations) or each surface. Each surface has an adaptive format designed to maximize its data capacity while maintaining a minimum reliability. Due to variations in surface quality, each surface has a different zone layout.

Several problems associated with prior art adaptive formatting are as follows:

1) Adaptive formatting can result in hard drives having different total data capacities even though they are built with identical components. This is particularly undesired in OEM applications and in high performance computers and network servers.

2) Adaptive formatting can require an increased number of transitions between different data rate zones and an increased number of long seek movements of the head transducers when reading or writing data. Both of these requirements slow the access time. This problem is at its worst when every surface in the drive has a different zone boundary layout.

3) Adaptive formatting can result in the different data rate zones of a hard drive having different capacities. For example, a particular hard drive may be able to store 100 MB at the highest data rate, but an identical drive formatted differently may have only 90 MB of storage at the same data rate. This difference is plainly 'visible' to circuitry external to the drive, which is undesirable. It is best for the data capacity of each data rate zone to be the same from drive to drive.

4) Adaptive formatting can make hard drives more expensive due to the increased amount of time and testing necessary to measure the capacity of each data surface and the increased time necessary to custom format each data surface.

U.S. Pat. No. 5,087,992 to Dahandeh et al. describes a method of assigning zone boundaries on a data surface by measuring the error rates associated with different data rates. A zone boundary is identified as the radius at which the error rate exceeds a predetermined maximum. Hard drives formatted according to this adaptive method will suffer from all the problems listed above. The method of Dahandeh does not allow control of the data storage capacity of an entire drive. The method of Dahandeh is applicable only to single surfaces. Dahandeh does not teach a method for obtaining a drive with predetermined capacity characteristics.

U.S. Pat. No. 5,430,581 to Moribe et al. describes a method of formatting data surfaces which optimizes the linear data density of data tracks by first measuring a signal-to-noise figure for each track. Each track has a data density which is determined by the S-to-N figure. The zone boundary locations are determined by comparing the S-to-N figures to predetermined values. The method or Moribe also suffers from the problems listed above for adaptive formatting, and it is only applicable to individual data surfaces.

U.S. Pat. No. 5,537,264 to Pinteric discloses a method of maximizing data capacity in a drive by separating the magnetic heads used in the drive into high and low transfer rate (data rate) groups. Warm heads operate at a high data rate and cold heads operate at a lower data rate.

U.S. Pat. No. 5,596,458 to Emo et al. discloses a method of adaptive formatting wherein the zone boundaries on the different data surfaces have different locations. Unfortunately, using Emo's method will likely result in each data surface of a hard drive having a different zone layout. The data capacity of a hard drive built in accordance with Emo will likely be different from drive to drive. Also, Emo does not include provisions for minimizing the seek times required for reading/writing data. Reading and writing data in a device built according to Emo's invention will likely result in slow access times because each data surface may have a different zone layout. Further, the different zone layouts result in more complicated address conversion algorithms for organizing the data stored in the drive, increasing the cost of the hard drive. In short, a hard drive built in accordance with Emo's invention will be plagued with the problems listed above.

OBJECTS AND ADVANTAGES OF THE INVENTION

Accordingly, it is a primary object of the present invention to provide methods of adaptive formatting and reading/writing data in a data storage device that:

1) results in total data capacity being the same from drive to drive;
2) results in different drives having the same capacity at each data rate;
3) minimizes the seek time and clock switches required for reading/writing data;
4) minimizes the amount of address code processing which must be performed in order to read/write data; and
5) increases the reliability and/or manufacturing yield of drives.

These and other objects and advantages will be apparent upon reading the following description and accompanying drawings.

SUMMARY OF THE INVENTION

These objects and advantages are attained by a method of formatting a number of data storage devices (drives) and a method of traversing the surfaces of adaptively formatted drives. Also, these objects and advantages are attained by drives adaptively formatted such that they have a minimized chance of failure.

A preferred adaptively formatted drive according to the present invention has cold and warm formatted surfaces. All the surfaces in the drive are formatted according to either a cold format or to a warm format. Preferably, there is one cold surface in the drive. The cold format and the warm format are designed such that the drive has a minimized chance of failure. Each adaptively formatted drive has a predetermined total data capacity and a predetermined data capacity in each data rate. Preferably, the total data capacity of the drive is equal to the total data capacity of a drive having nominally formatted surfaces. Also preferably, the data capacity in each data rate of the drive is equal to the data capacity in each data rate of a drive having nominally formatted surfaces.

An alternative, less preferred, adaptively formatted drive according to the present invention has cold, hot and nominal formatted surfaces. All the surfaces in the drive are formatted according to either a cold format, a hot format, or a nominal format. Preferably, the number of cold and hot surfaces in the drive is equal. Also preferably, there is one cold and one hot formatted surface in the drive. The cold format and the hot format are designed such that the drive has a minimized chance of failure. A method for calculating the proper data loads for minimized failurt is discussed below.

The cold/nominal/hot adaptively formatted drive has a predetermined total data capacity and a predetermined data capacity in each data rate. Preferably, the total data capacity of the drive is equal to the total data capacity of a drive having nominally formatted surfaces. Also preferably, the data capacity in each data rate of the drive is equal to the data capacity in each data rate of a drive having nominally formatted surfaces. Preferably, the cold and hot surfaces have mutually compensation data loads such that the data load of two nominal surfaces is equal to the data load of a cold surface and hot surface. However, the data loads on cold and hot surfaces are not necessarily compensating.

To adaptively format a drive in accordance with the present invention, a figure of merit is first measured for each surface in the drive. Preferably, the figure of merit is mean squared error. At least one surface is identified as a cold surface. Preferably, there is one cold surface in each drive. The cold surface is the surface with the lowest theoretical data capacity as measured by the figure of merit. All the other surfaces in the drive are identified as warm surfaces. The cold surfaces are then formatted according to a cold format and the warm surfaces are formatted according to a warm format. The cold format has a lower data load than the warm format. All the drives formatted have the same total data capacity and the same data capacity in each data rate. Preferably, the total data capacity of the drive is equal to the total data capacity of a drive having nominally formatted surfaces. Also preferably, the data capacity in each data rate of the drive is equal to the data capacity in each data rate of a drive having nominally formatted surfaces.

Preferably, the cold surface data load and the warm surface data load are selected such that the manufacturing yield of the drives is maximized.

Preferably, the different formats are distinguished in that they have different zone layouts (zone boundary locations). The cold surface layout and warm surface layout are designed such that the cold surface has a smaller data load than the warm surfaces. This is accomplished by moving the zone boundaries of the warm surfaces further from the axis of rotation and moving the zone boundaries of the cold surface closer to the axis of rotation.

Alternative embodiments of the present invention have different formats for the cold and warm surfaces based on variations in track pitch or error correction code bytes (ECC bytes) per data block. Each cold surface receives a wider track pitch or more ECC bytes per data block than a warm surface.

A second embodiment of the present invention for adaptively formatting drives includes the step of measuring a figure of merit for each surface and then identifying the surfaces as hot, cold, or nominal. The hot surface has the highest theoretical data capacity as measured by the figure of merit and the cold surface has the lowest theoretical data capacity. The data loads of hot and cold surfaces are mutually compensating such that one warm surface and one cold surface have a data load equal to two nominal surfaces. There is at least one hot surface in each drive and at least one cold surface in each drive. Preferably, there is an equal number of hot and cold surfaces in each drive. Also preferably, the total data capacity of an adaptively formatted drive is equal to the total data capacity of a nominally formatted drive. The cold and hot surfaces can be adaptively formatted by varying the zone layout, track pitch or ECC bytes per data block. All the adaptively formatted drives have the same total data capacity and the same data capacity in each data rate. Preferably, the total data capacity of the drive is equal to the total data capacity of a drive having nominally formatted surfaces. Also preferably, the data capacity in each data rate of the drive is equal to the data capacity in each data rate of a drive having nominally formatted surfaces.

Preferably, the cold surface data load and the hot surface data load are selected such that the manufacturing yield of the adaptively drives is maximized.

To traverse a drive in accordance with the present invention, all like formatted surfaces are traversed together using cylinder access mode traversal or zone access mode traversal. It is preferable to use cylinder access mode traversal. In a drive formatted with warm and cold surfaces, for example, all the warm surfaces are traversed and then all the cold surfaces are traversed, or vice versa. In a drive formatted with hot, cold, and nominal surfaces, all like formatted surfaces are traversed together. If the drive has a single cold surface or single hot surface, then this single surface is traversed using radial access mode. Drives formatted by varying ECC bytes per data block do not require a special traversal method and can be traversed using known methods for traversing nominally formatted drives.

Drives adaptively formatted with variable date rate layouts can also be traversed according to the present invention.

In a drive formatted with hot, cold, and nominal surfaces, single hot and cold surfaces are traversed using radial access mode.

DETAILED DESCRIPTION

The present invention provides a method of adaptively formatting the multiple surfaces of data storage devices such as hard drives. The method improves the reliability of a hard drive while providing drive-to-drive consistency in data capacity and consistency in capacity of each data rate. Also, the method tends to minimize the complexity present in the formatting of the data surfaces of a hard drive. This makes the formatting method simple to implement in a manufacturing environment.

The present invention also provides adaptively formatted drives having a minimized chance of failure for a given predetermined ttal data capacity.

Also disclosed is a traversal method for reading and writing data efficiently to the data surfaces of a drive formatted in accordance with the formatting method. The traversal method of the present invention provides fast and efficient access to stored data. This is accomplished by minimizing long seek movements and data rate switches which are necessary when scanning from different data surfaces and data zones of a hard drive.

It is well known in the art of hard drive construction that data surfaces of a hard drive often have performance variations. These variations can be due to differences in surface quality or read/write head quality. The source of the variations is immaterial as each surface is permanently mated with a read/write head. It is well known in the art of hard drive construction that there are many reasons for variations in the performance of surface/head pairs. It is noted that references herein to the performance of data surfaces can be understood to encompass the performance of surface/head pairs.

Figure 1:
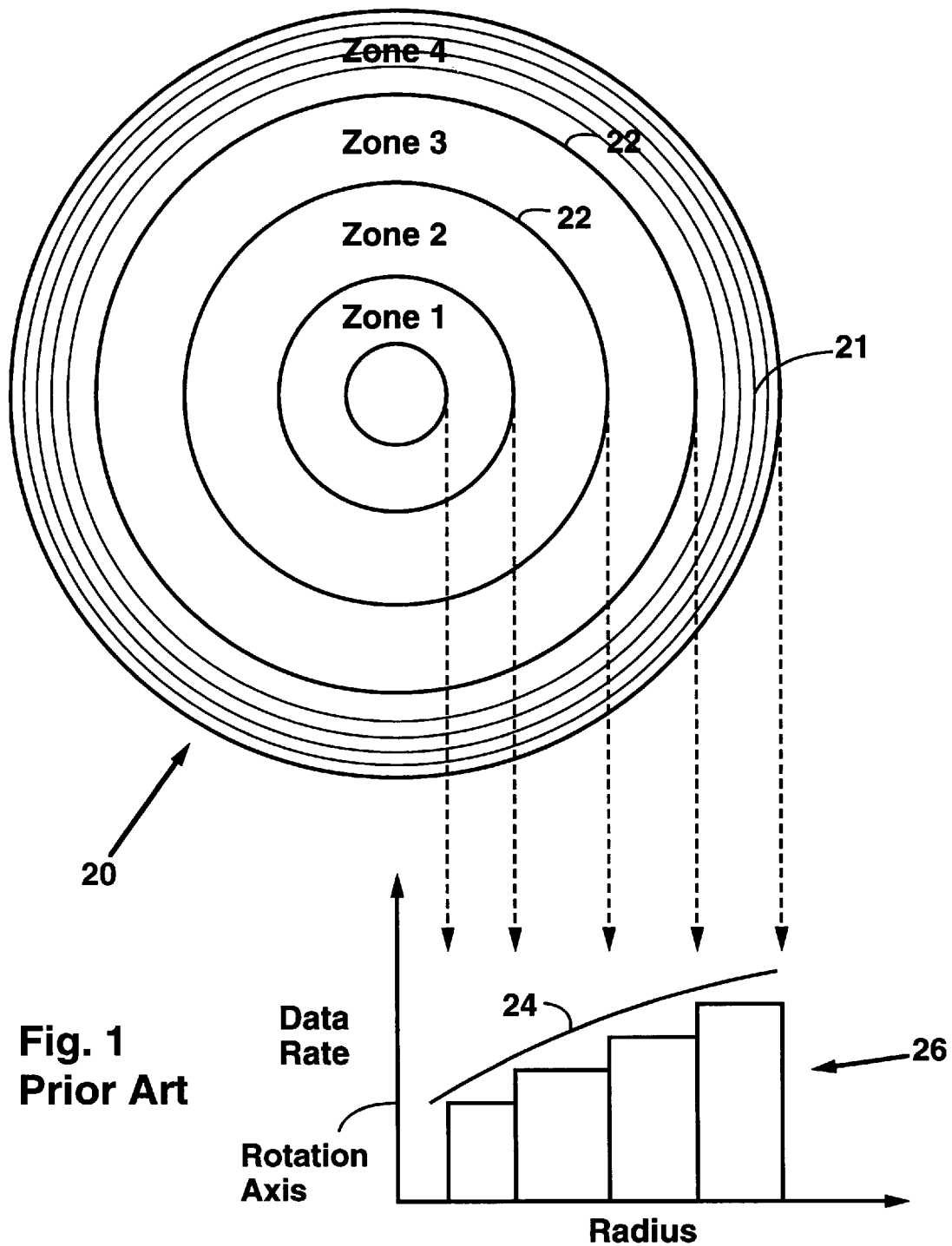
FIG. 1 (prior art) illustrates the strategy behind the zone layout in prior art devices.
Figure 2:
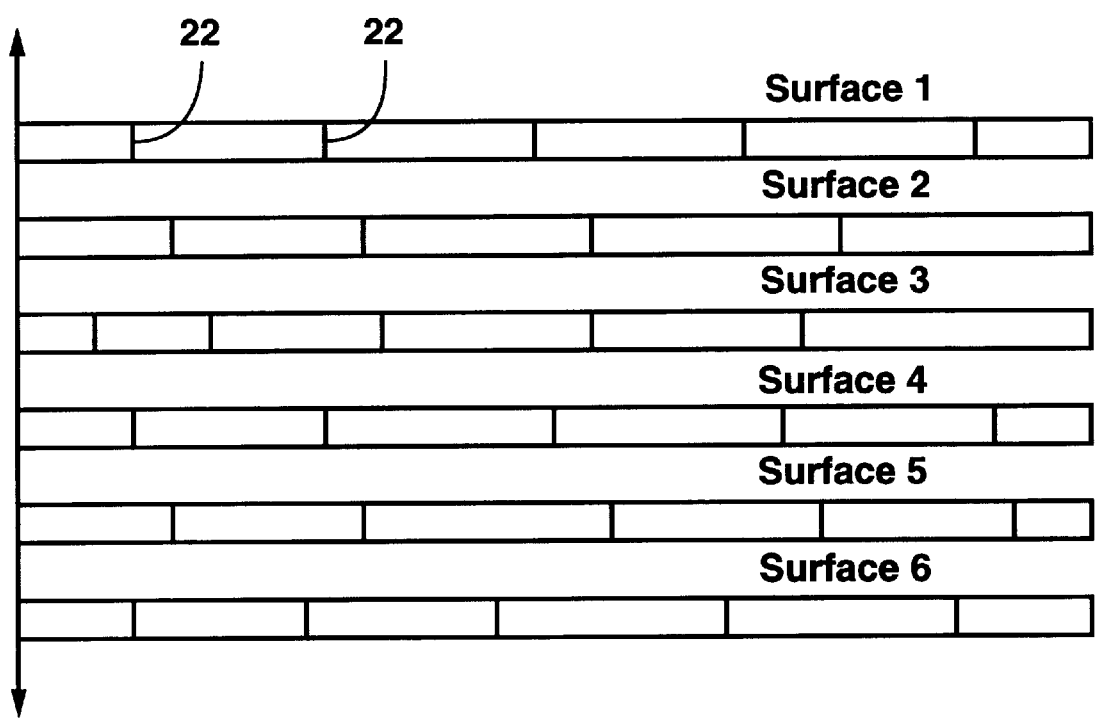
FIG. 2 (prior art) illustrates an adaptively formatted hard drive wherein each data surface has a different zone layout.
Figure 3:
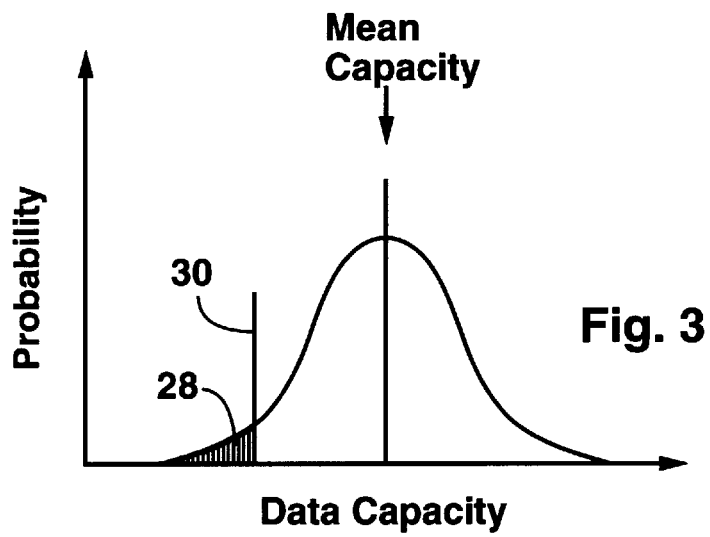
FIG. 3 shows the probability distribution in the data capacity of surface/head pairs.

FIG. 3 shows a probability distribution of the data capacity of surface/head pairs. The total area under the curve is equal to unity. A nominal data load 30 must be chosen so that the chance of the nominal data load 30 exceeding the actual data capacity of any surface is small. The nominal data load 30 is determined by the format of the data surface. Different formats will correspond to different data loads. The surface area of the shaded area A 28 represents the portion of surfaces which will fail when formatted according to the nominal data load 30. Equivalently, the shaded area A 28 represents the probability that any given surface will fail. For a hard drive having N data surfaces, the probability P that at least one data surface will have a data capacity less than the nominal data load is:

$$P=1-(1-A)^N$$

In these cases, the hard drive will fail, i.e., it will have an unacceptably high error rate when data is read. The probability of failure increases as the number of surfaces N increases and as the nominal data load 30 increases.

It has been found through research by the present inventors that most failed hard drives with multiple surfaces fail because of only one poor quality surface/head pair. For example, about 80% of the failures in drives with 18 surfaces are due to the failure of one surface. Therefore, failures in many such drives can be prevented by reducing the data load on the single poorest quality data surface. Manufacturing yields can be improved by shifting data load from one surface to another while maintaining a constant data load on the drive as a whole. Most of the improved yield benefit results from reducing the data load on the single poorest surface in the drive. A smaller additional yield improvement can be achieved by reducing the data load on a second poor quality surface in each drive. However, this improvement is small and often will not justify the added complication.

Figure 4:
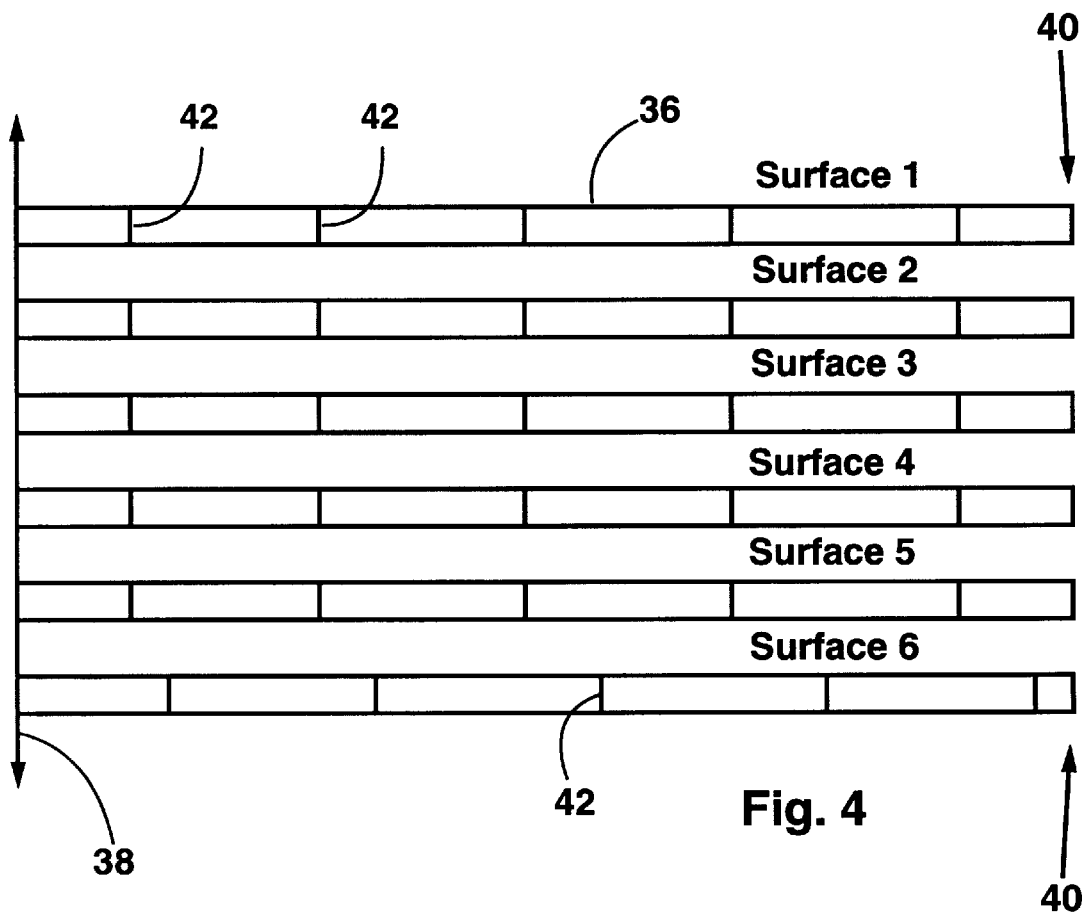
FIG. 4 shows a side view of a 6-surface drive formatted according to the preferred embodiment of the present invention. The drive has one cold formatted surface.

FIG. 4 shows a 6-surface data storage device which has been formatted according to the present invention. FIG. 4 shows a side view of one half of each surface 36 (from rotation axis 38 to outer edge 40), and the locations of zone boundaries 42 on the different data surfaces. Although FIG. 4 shows only 6 surfaces, the present invention is applicable to storage devices having any number of data surfaces.

In the preferred embodiment of the present invention, the data load of each surface is varied by altering the locations of the zone boundaries 42 on the different surfaces 36. All the zone boundaries 42 of surface 6 are displaced away from the axis of rotation 38 compared to the corresponding zone boundaries 42 of surfaces 1–5. This results in surface 6 having a lower average data density and a lower data load than surfaces 1–5 which have zone boundaries 42 closer to the rotation axis 38. Surfaces which have an unusually low data load capability (theoretical data capacity) are cold surfaces. Surfaces 1–5 have a higher theoretical data capacity than surface 6. Surface 6 is a cold surface and the zone boundary pattern of surface 6 is termed a cold zone layout. Surface 6 is selected to receive the cold zone layout because it has been empirically measured to have a lower theoretical data capacity compared to surfaces 1–5. In other words, surface 6 is inferior to surfaces 1–5, possibly as a result of manufacturing defects or manufacturing inconsistencies. Reducing the data load on surface 6 will decrease the possibility of high error rates when reading data from surface 6, and therefore will likely prevent hard drive failure.

In the preferred embodiment of the present invention the data capacity of an adaptively formatted drive has the same data capacity as a drive formatted without any type of adaptive formatting (a nominally formatted drive). In the example of FIG. 4, this can be achieved by slightly increasing the data load on surfaces 1–5 to compensate for the decreased data load on surface 6. Preferably, the increased data load on surfaces 1–5 is achieved by moving the zone boundaries of surfaces 1–5 closer to the axis of rotation. This zone boundary pattern is termed a warm zone layout. Surfaces capable of accepting this increased data load are termed warm surfaces.

Figure 5A:
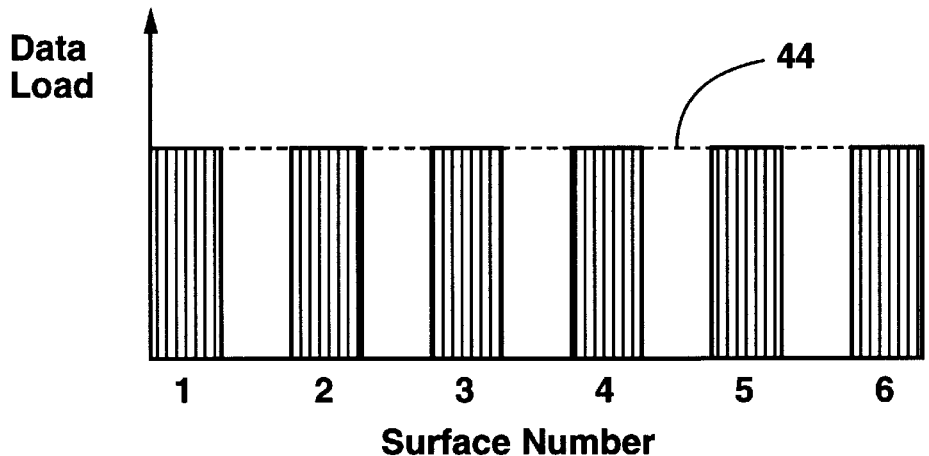
FIG. 5A shows the data loading of a nominally formatted 6-surface drive.
Figure 5B:
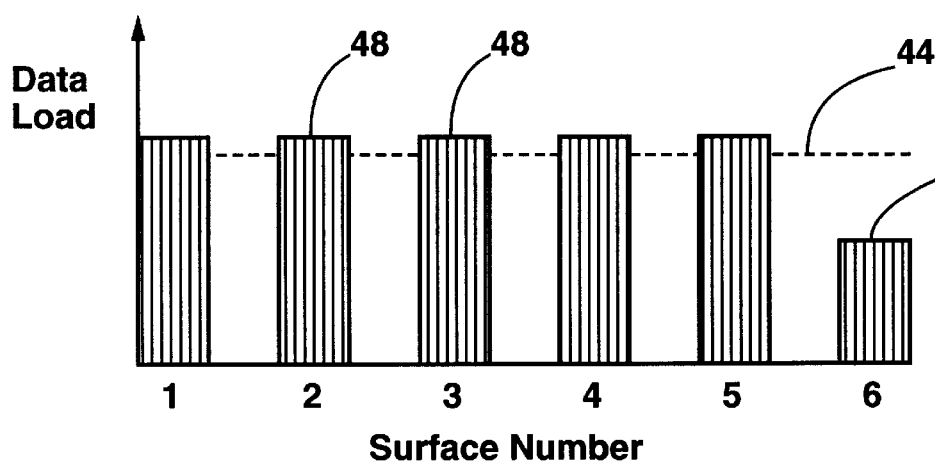
FIG. 5B shows the data loading of an adaptively formatted 6-surface drive according to the preferred embodiment of the present invention.

FIGS. 5A and 5B illustrate the data loads on the 6 surfaces of two differently formatted drives. FIG. 5A schematically shows the data load on the surfaces of a 6-surface nominally formatted drive. All the surfaces hold a nominal load 44 of data. FIG. 5B shows the data loads in a drive adaptively formatted according to the preferred embodiment of the present invention. The cold surface (surface 6) data load 46 is less than the nominal load 44 and the warm surface (surfaces 1–5) data load 48 is greater than the nominal load 44. The total capacity of a drive formatted according to FIG. 5A is the same as the total capacity of a drive formatted according to FIG. 5B. Increased data loads on the warm surfaces (surfaces 1–5) exactly compensates for decreased data load on the cold surface (surface 6).

Figure 6A:
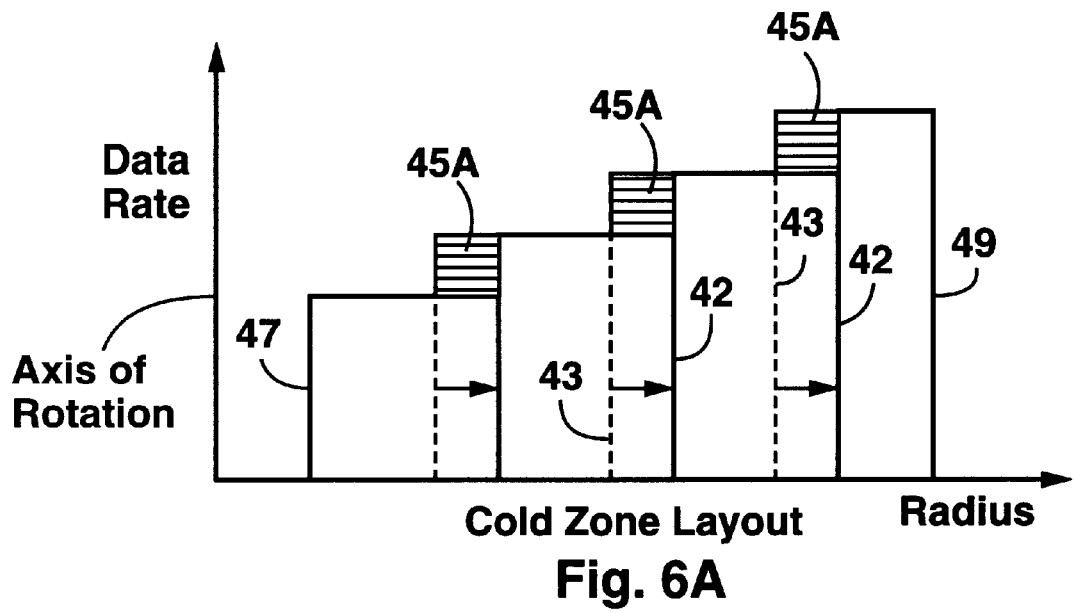
FIGS. 6A and 6B show the effect of moving zone boundaries upon the data load and data capacity in each data rate.

FIG. 6A shows the data rate in each of the data zones in a surface formatted according to a cold zone layout. Each of the zone boundaries 42 is displaced away from the axis of rotation compared to zone boundaries of a nominal zone layout. The zone boundaries of the nominal zone layout is represented by dotted lines 43. The amount of data load reduction compared to a nominal zone layout is proportional to the area inside shaded boxes 45A. It is noted that innermost zone boundaries 47 and outermost zone boundaries 49 cannot be moved. The data rate in the innermost zone must be selected such that it will not fail on a cold surface.

Figure 6B:
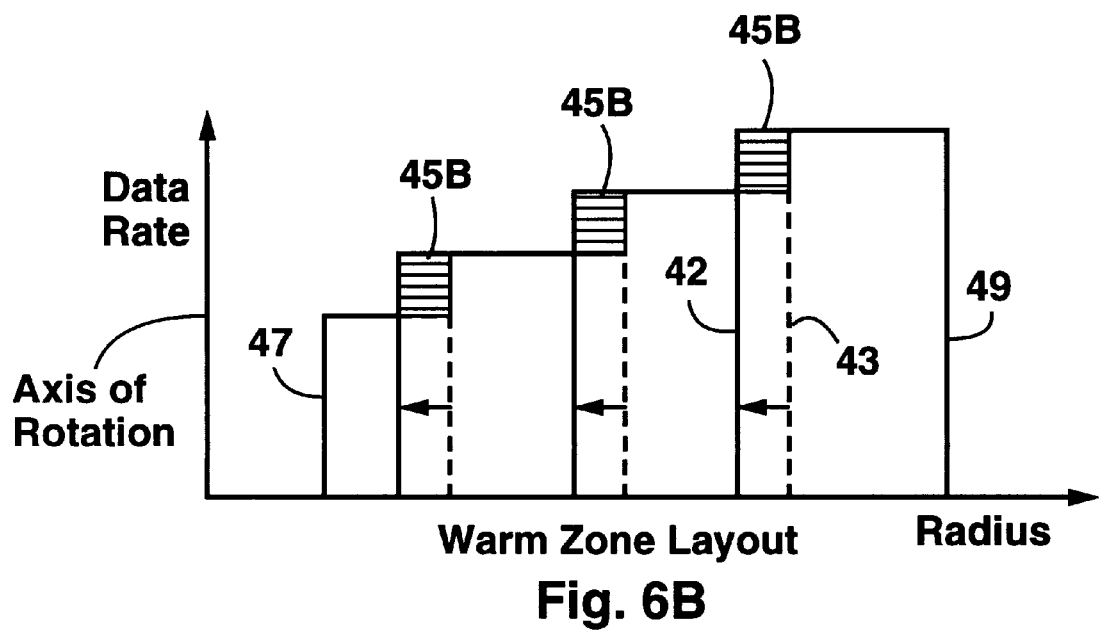

FIG. 6B shows the data rate in each of the data zones in a surface formatted according to a warm zone layout. The amount of data load gained compared to a nominal zone layout is proportional to the area inside shaded boxes 45B.

Based on FIGS. 6A and 6B, it will be obvious to one skilled in the art of drive formatting how to design the cold and warm zone layouts such that an adaptively formatted drive has the same total data capacity as a nominally formatted drive.

The warm and cold zone layouts can be designed such that the data capacity at each data rate is the same for adaptively formatted drives and nominally formatted drives. This is a preferred embodiment of the present invention. Based on FIGS. 6A and 6B, It will be obvious to one skilled in the art of hard drive formatting how to design warm and cold zone layouts such that the data capacities in each data rate are the same for adaptively formatted drives and nominally formatted drives.

The present invention includes several other methods of varying the data load per surface. As mentioned, the preferred method is by varying the zone boundary locations. Another possible method of varying the data load is to vary the number of error correction code bytes (ECC bytes) per data block. Error correction codes are used to minimize errors when data is read from a data surface. Cold surfaces can have a larger number of ECC bytes per data block than warm surfaces. Increasing the number of ECC bytes per data block reduces the data load of a cold surface, but improves reliability.

Another method of varying data load on a data surface is to change the number of tracks per surface. This can be accomplished by changing the distance between adjacent tracks (the track pitch) Warm surfaces can have a closer track pitch than cold surfaces.

It is noted that the present invention includes the possibility of varying the number of error correction code bytes (ECC bytes) per data block or varying track pitch (distance between adjacent tracks) in order to produce cold formats and warm formats with different data loads. These methods of altering data load per surface can be used to create a cold ECC layout, a warm ECC layout, a cold track pitch layout, and a warm track pitch layout. It is well known in the art of drive construction how to vary ECC bytes and track pitch in order to achieve a desired data capacity and data capacity in each data rate. According to the present invention, adaptive formatting can be accomplished by varying ECC bytes, track pitch, or zone boundary locations.

Based on the discussion herein, it will be obvious to one skilled in the art of drive formatting how to design adaptive formats based on varying ECC bytes or track pitch such that the total data capacity of a drive is the same as a nominally formatted drive. Further, based on the discussion herein, it will be obvious to one skilled in the art how to design adaptive formats based on varying ECC bytes or track pitch such that the data capacity in each data rate is the same as a nominally formatted drive. The effects of varying ECC bytes and track pitch on data load are known in the art of drive formatting. Reference can be made to *Error-Correction Coding for Digital Communications,* Clark, G. C. and Cain, J. B., Plenum Press, New York, 1981 concerning error correction codes and how they can be used to improve bit error rates. Also, reference can be made to *Theory of Magnetic Recording,* Bertram, H. N., Cambridge University Press, Cambridge, 1994. Reference can also be made to *Magnetic Recording, Vol III Computer Data Storage,* C. Denis Mee and Eric D. Daniel, McGraw-Hill, New York, 1998, which discusses error correction codes in sections 5.4 through 5.7, and linear density and track pitch in section 2.5.

Cold zone layout, cold ECC layout, and cold track pitch layout are all examples of cold formats which can be used in the present invention. Similarly, hot zone layout, hot ECC layout, and hot track pitch layout are all examples of hot formats which can be used in the present invention.

In a nominally formatted drive (as in FIG. 5A), all the surfaces have the same nominal data load 44, which is determined by establishing a maximum acceptable error rate and loading the surfaces with a data load that results in the maximum acceptable error rate. The surfaces in such a drive are identically formatted according to a nominal format. The location of the nominal data load 30 (as shown in FIG. 3) corresponding to the nominal format can be expressed in terms of a number standard deviations from the mean data capacity.

The cold format has a lower data load than a nominal format, and the warm format has a higher data load than a nominal format. Warm and cold formats can be designed such that a drive adaptively formatted according to the present invention has the same capacity as a drive comprising only surfaces with the nominal format. This is a preferred embodiment of the present invention. The cold and warm formats can be adaptively formatted by means of different zone layouts, ECC layouts, or different track pitch layouts.

Figure 7:
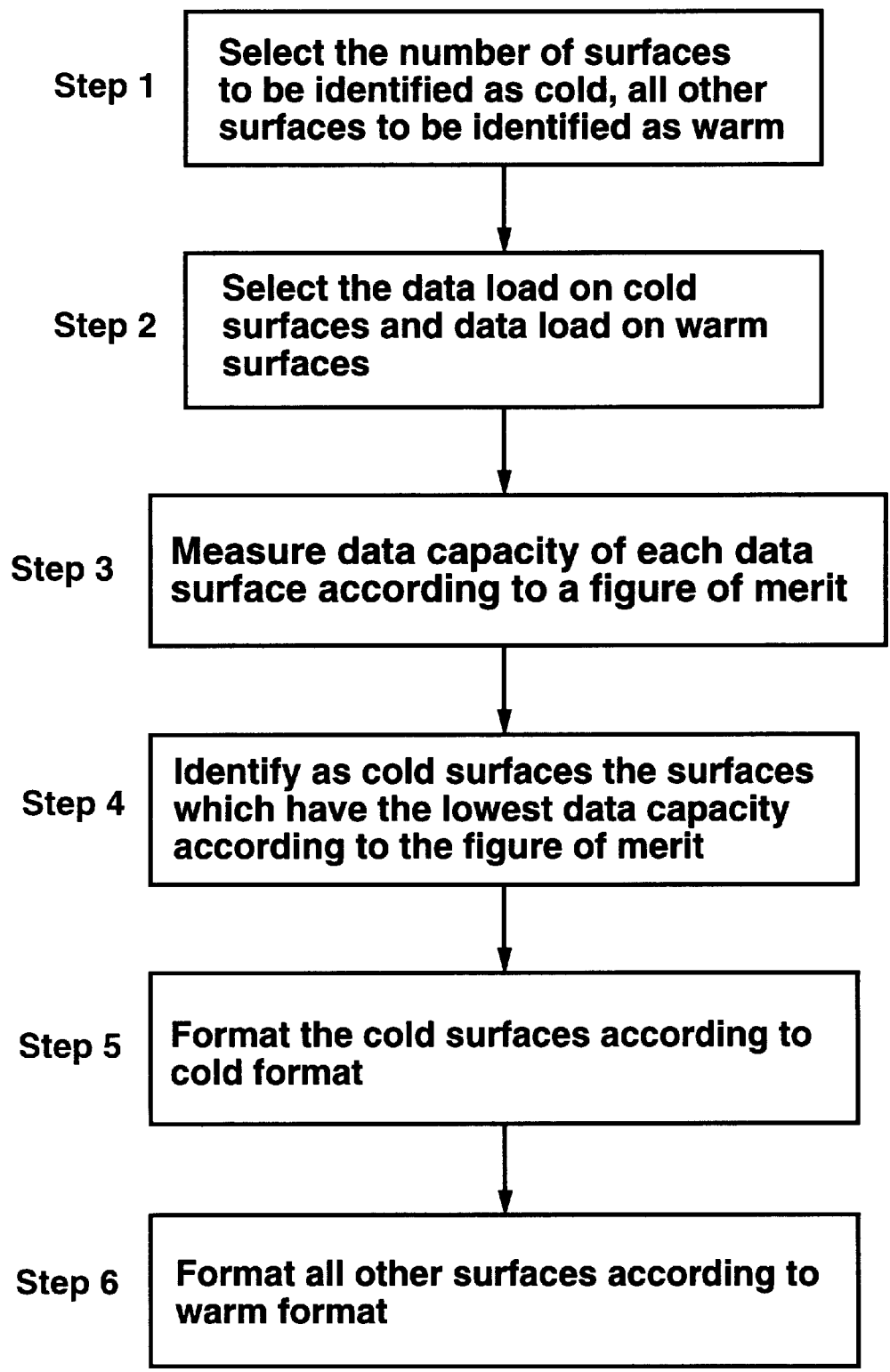
FIG. 7 is a flow chart describing a preferred method for formatting according to the present invention.

FIG. 7 is a flow chart illustrating a preferred method for formatting drives according to the present invention. Steps 1 and 2 are performed once for all drives such that each drive has the same number of cold surfaces and the same number of warm surfaces, and each drive has the same data capacity. Subsequent steps 3–6 are performed for each drive on an individual basis.

In step 1, the number of surfaces to be formatted as cold is selected. In the preferred embodiment, only one surface is formatted with a cold format. However, in alternative embodiments, 2, 3 or more surfaces are formatted cold. Formatting more surfaces as cold per drive requires that the remaining warm surfaces carry a larger data load. It is noted that when using the method of the present invention, the number of cold surfaces is the same for every adaptively formatted drive. This requirement results in every adaptively formatted drive having the same data capacity and the same capacity in each data rate.

In step 2, the data load to be carried by the warm and cold data surfaces is established. The data loads on the warm and cold surfaces are preferably determined only by the locations of the zone boundaries. Warm surfaces have zone boundaries displaced closer to the rotation axis compared to the nominal format. Cold surfaces have zone boundaries displaced further from the rotation axis compared to the nominal format. Alternatively, variations in ECC bytes and track pitch can also be used. Cold surfaces have more ECC bytes per data block than warm surfaces. Cold surfaces have wider track pitch than warm surfaces.

Step 3 is a measurement step which empirically determines which surfaces inside the drive should be designated as the cold and warm surfaces. A figure of merit (FOM) is measured for each surface. The figure of merit is preferably mean squared error (MSE), but can be any measurement which is an accurate measurement of the data capacity of a data surface. Other examples of FOMs which can be used include Viterbi margin measurement or bit error rate measurement. However, MSE is preferred as the FOM in the present invention because it is easy to measure. MSE and bit error rate are well known techniques in the art of statistical measurement. Reference can be made to U.S. Pat. No. 5,392,295 for information on how to perform MSE and Viterbi margin measurements on data surfaces.

In step 4 the surfaces having the lowest data capacity as measured in step 3 are selected. The poorest surfaces are designated as cold surfaces. If one surface per drive is to be designated as a cold surface, then only the poorest surface of the drive is formatted cold. If two surfaces are to be designated cold, then the two poorest surfaces are formatted cold.

In steps 5 and 6 all the warm and cold surfaces are formatted. All the warm surfaces are formatted according to the same warm format. All the cold surfaces are formatted according to the same cold format. All surfaces in the drive are either warm or cold surfaces. It is noted that if different drives have different numbers of cold and warm surfaces formatted according to the same cold and warm formats, then the data storage characteristics will differ from drive to drive. This is highly undesirable. Therefore, when manufacturing drives in volume it is necessary to predetermine the number of surfaces that will be formatted according to each of the cold and warm formats. Then, every adaptively formatted drive has the same number of cold formatted and warm formatted surfaces.

Figure 8:
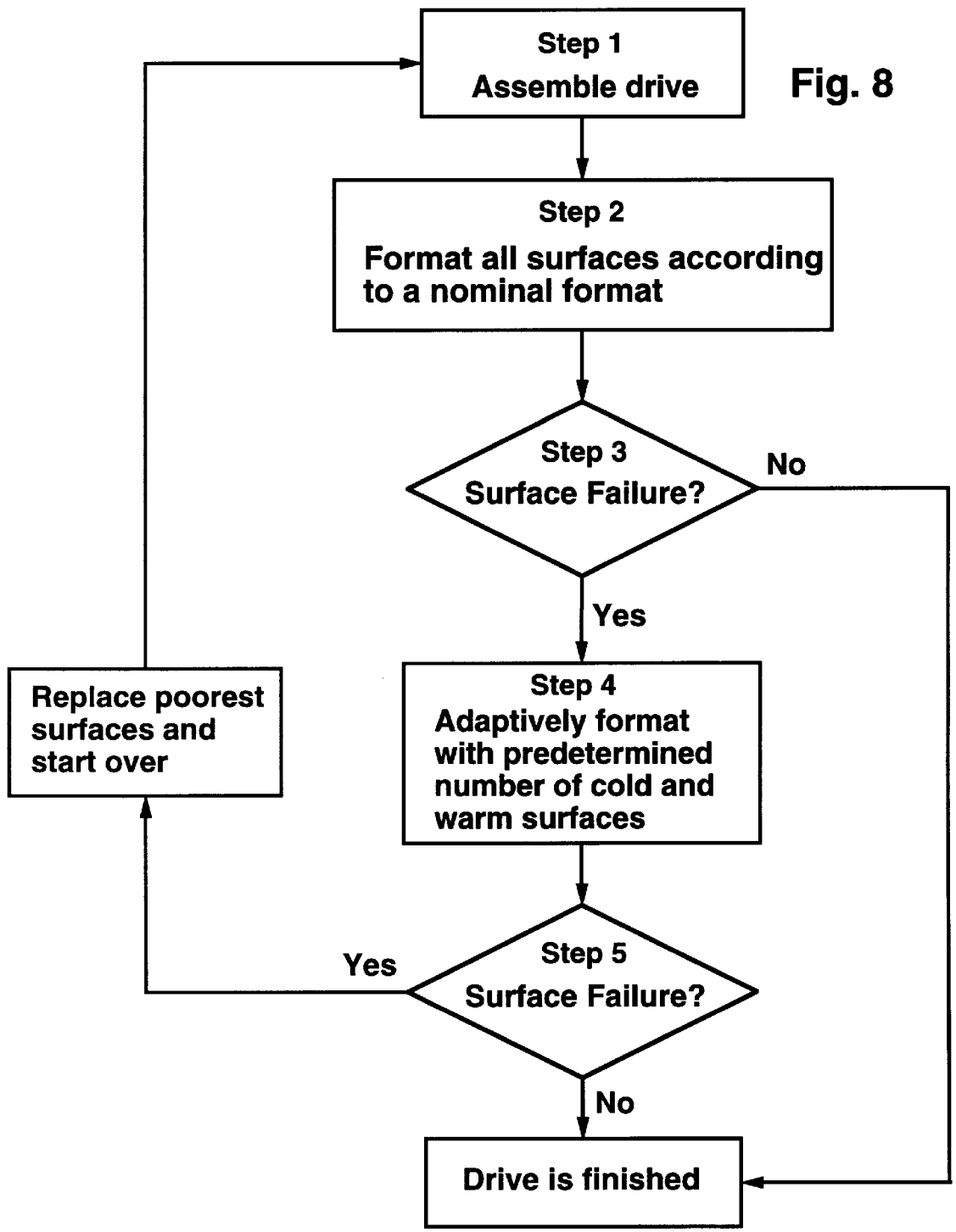
FIG. 8 is a flow chart describing how adaptive formatting can be implemented in a process for manufacturing mainly nominally formatted drives.

One advantage of the present invention is that adaptively formatted drives have the same total data capacity and capacity in each data rate as nominally formatted (nonadaptively formatted) drives. This enables a drive manufacturing process to be created where the drives produced are identical in terms of data storage characteristics (total capacity and capacity in each data rate), but different in terms of formatting. In fact, drives may or may not be adaptively formatted. Only drives which fail an initial test need be adaptively formatted, with the rest being nominally formatted. FIG. 8 shows a method for adaptively formatting only drives which fail an initial test. All the drives formatted according to FIG. 8 will have the same data storage characteristics, yet may or may not be adaptively formatted.

In step 2 of FIG. 8, the drive is nominally formatted. This means that all the surfaces are formatted according to the same nominal format. The nominal format depends upon the desired data capacity and error tolerance. It is very well known in the art how to format drives according to the nominal format and how to design an appropriate nominal format. Next, in step 3, each drive is tested for errors. If the drive passes, then it is declared a finished drive. If the drive fails the error test of step 3, then the drive is reformatted (adaptively) with a predetermined number of warm and cold surfaces (step 4). The adaptive formatting is designed such that the data storage characteristics are the same as a drive nominally formatted according to step 2. This ensures that every finished drive has the same data storage characteristics, whether or not it is adaptively formatted.

It is obvious that the present invention is applicable to drives having any number of data surfaces. However, depending upon the characteristics of the surfaces used and the number of surfaces used, it may not be preferable to have only one cold formatted surface. If the drive has a large number of surfaces, for example, then it may be best to have a larger number of cold formatted surfaces.

An alternative embodiment uses three different formats on the different surfaces of a drive. The three formats are named cold, nominal, and hot. The cold and hot formats are preferably designed such that the sum of the data load of a hot and cold surface is equal to two nominal surfaces. In other words, the data capacity difference between a cold format and a nominal format is equal to the data capacity difference between a hot format and a nominal format. Hot and cold formats are mutually compensating in terms of data storage characteristics. Therefore, the total capacity of a drive is the same as a nominal drive if the number of cold formatted and hot formatted surfaces is equal. Preferably, the drives are formatted such that there is one cold formatted surface and one hot formatted surface on each drive. The cold and hot formats are not necessarily mutually compensating.

Figure 9:
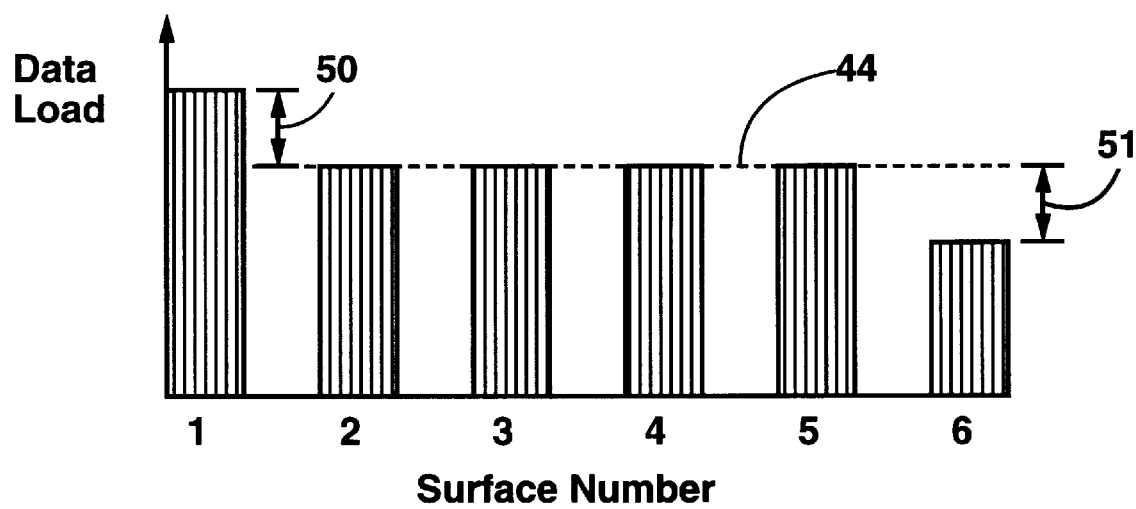
FIG. 9 shows the data loading of an adaptively formatted 6-surface drive according to a second embodiment of the present invention.

FIG. 9 shows the data load of a 6-surface drive formatted according to a preferred version of the alternative embodiment. Surface 1 has a hot format, surface 6 has a cold format, and surfaces 2–4 have a nominal format. The amount of additional data loading 50 on surface 1 balances the reduced data loading 51 on surface 6 such that the drive has a capacity equal to a nominally formatted drive. Preferably, the hot format compensates for the cold format on a one-to-one basis. In other words, one hot formatted surface and one cold formatted surface combined have the same data load as two nominally formatted surfaces. Given the previous discussion, it will be obvious to one skilled in the art of drive formatting how to mutually compensate the data loads on the hot and cold formatted surfaces.

Preferably, the number of hot formatted surfaces is equal to the number of cold formatted surfaces in order to achieve drive-to-drive consistency and reliability. Preferably, one surface is formatted cold and one surface is formatted hot.

Also preferably, the hot format of the hot surface and the cold format of the cold surface are designed such that the drive has the same capacity in each data rate as a nominally formatted drive. It will be obvious to one skilled in the art of drive formatting how to design hot and cold formats such that nominally and adaptively formatted drives have the same capacity in each data rate. Reference can be made to FIGS. 6A and 6B.

Figure 10:
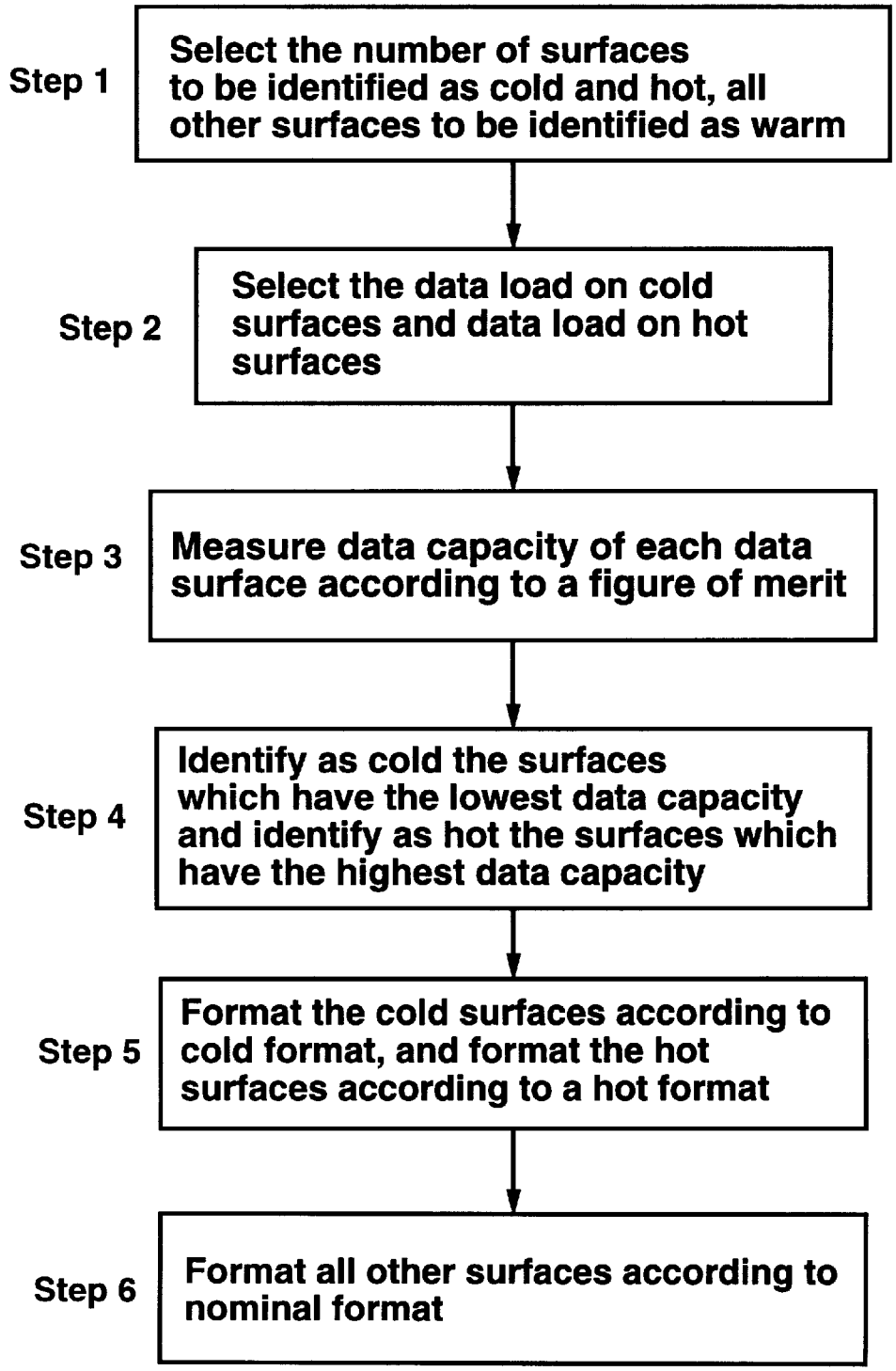
FIG. 10 is a flow chart describing a method for formatting according to a second embodiment of the present invention which uses three zone layouts.

FIG. 10 shows a flow chart describing the method of formatting using cold, nominal, and hot formats. The method is analogous to the method of the first embodiment described with reference to FIG. 7.

Figure 11:
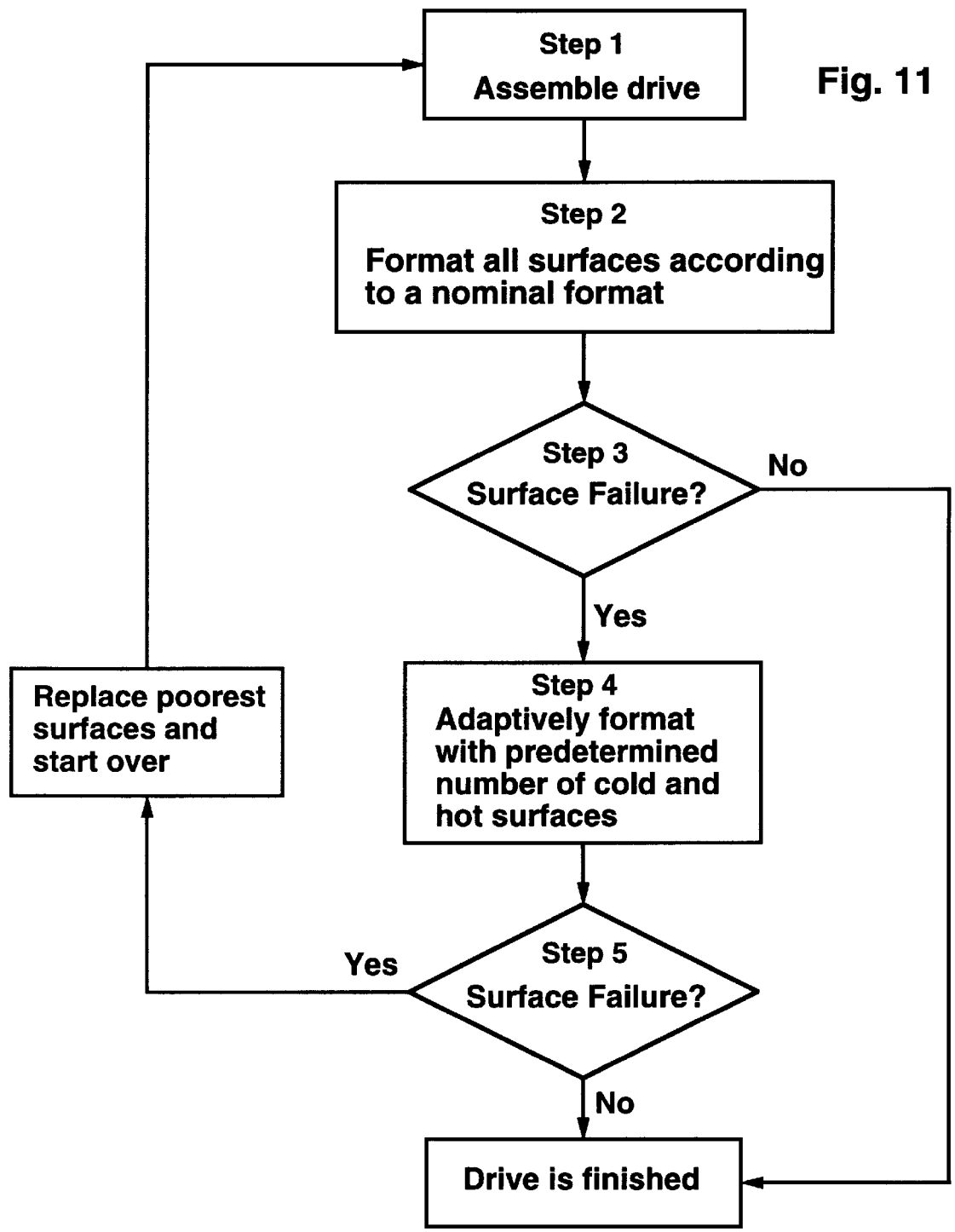
FIG. 11 is a flow chart describing how the embodiment of FIG. 10 can be implemented in a process for manufacturing mainly nominally formatted drives.

The method of FIG. 10 can also be combined with nominal (nonadaptive) formatting. This is shown in the flow chart of FIG. 11. Here, all drives are nominally formatted in step 2. If the drive fails the test step of step 3, then it is adaptively formatted in accordance with the second embodiment in step 4. The method of FIG. 11 ensures that every finished drive has the same data storage characteristics, whether or not it is adaptively formatted.

In the cold/warm formatting embodiment, the data load on the cold and warm surfaces is preferably selected such that that manufacturing yield of the drives is maximized. The optimum data load on the cold and warm surfaces will depend upon the bell curve shape of FIG. 3, the nominal data load 30 location (i.e., the data load for a nominal format) and the total number of surfaces N in the drive. Adaptive formatting can be thought of as 'data transfer' from the cold to warm surfaces. For a particular group of drives, there exists an optimum amount of data transfer which results in a maximized yield. The amount of data transfer in a particular drive is determined by the cold, warm formatting. If too much data is transferred from the cold to warm surfaces, then the warm surfaces have an increased chance of failure which outweighs the decreased chance of failure by the cold surfaces. Conversely, if too little data is transferred, then the cold surfaces are still likely to fail, and little benefit is achieved. In between these two extremes there exists an optimum amount of data transfer, which is expressed as a percentage of the data capacity of a nominally formatted surface. Preferably, the cold and warm surfaces are formatted such that the manufacturing yield of a group of cold/warm drives is maximized.

As explained above, for nominally formatted drives the manufacturing yield (percentage of drives which do not fail) will be:

$$Y=(1-A)^N,$$

Where A is the probability of a single surface failing (i.e., the shaded area 28 under the curve of FIG. 3), and the surfaces are formatted with a capacity equal to the nominal data load 30. This equation assumes that the surfaces of a given drive behave independently, i.e., particularly warm or cold surfaces in a drive are not correlated. Warm and cold surfaces are randomly distributed among drives.

Figure 12:
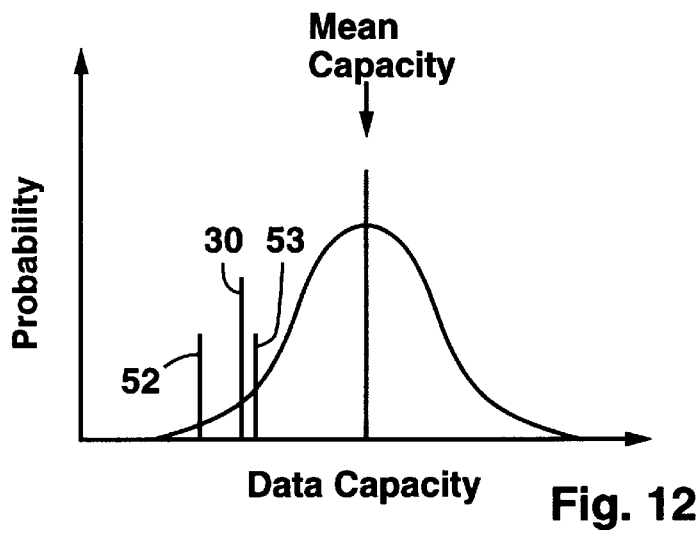
FIG. 12 is a data capacity probability distribution showing the cold data load, nominal data load and warm data load.

FIG. 12 shows a theoretical capacity probability distribution curve for data surfaces. The cold surfaces are formatted with a data load equal to a cold data load 52, and the warm surfaces are formatted with a data load equal to a warm data load 53. The expected yield for drives formatted with 1 cold surface and N−1 warm surfaces is:

$$\text{Yield}=N(P_{cw})(P_w)^{(N-1)}+P_w^N$$

Where N is the total number of surfaces, $P_{cw}$ is the probability that a surface has a capacity between the cold data load 52 and the warm data load 53, and $P_w$ is the probability that a surface has a capacity greater than the warm data load 53. This equation will allow one skilled in the art of statistical quality control and mathematics to calculate the yield for a given choice of formats, and therefore the optimum amount of data transfer to achieve maximum yield for a particular group of drives. The data load on the cold and warm surfaces can then be adjusted to maximize the yield for a particular group of drives.

Yield calculations can be used to calculate the probability of failure for a single adaptively formatted drive. A maximized yield for a group of drives indicates that the probability of failure for any individual drive in the group is minimized. Yield maximization for a group of drives is equivalent to failure probability minimization in an individual drive.

For cold/warm drives with more than 1 cold surface, the yield calculation is considerably more complex. However, this problem can be regarded as a special case of the hot/nominal/cold yield calculation discussed below.

Figure 13:
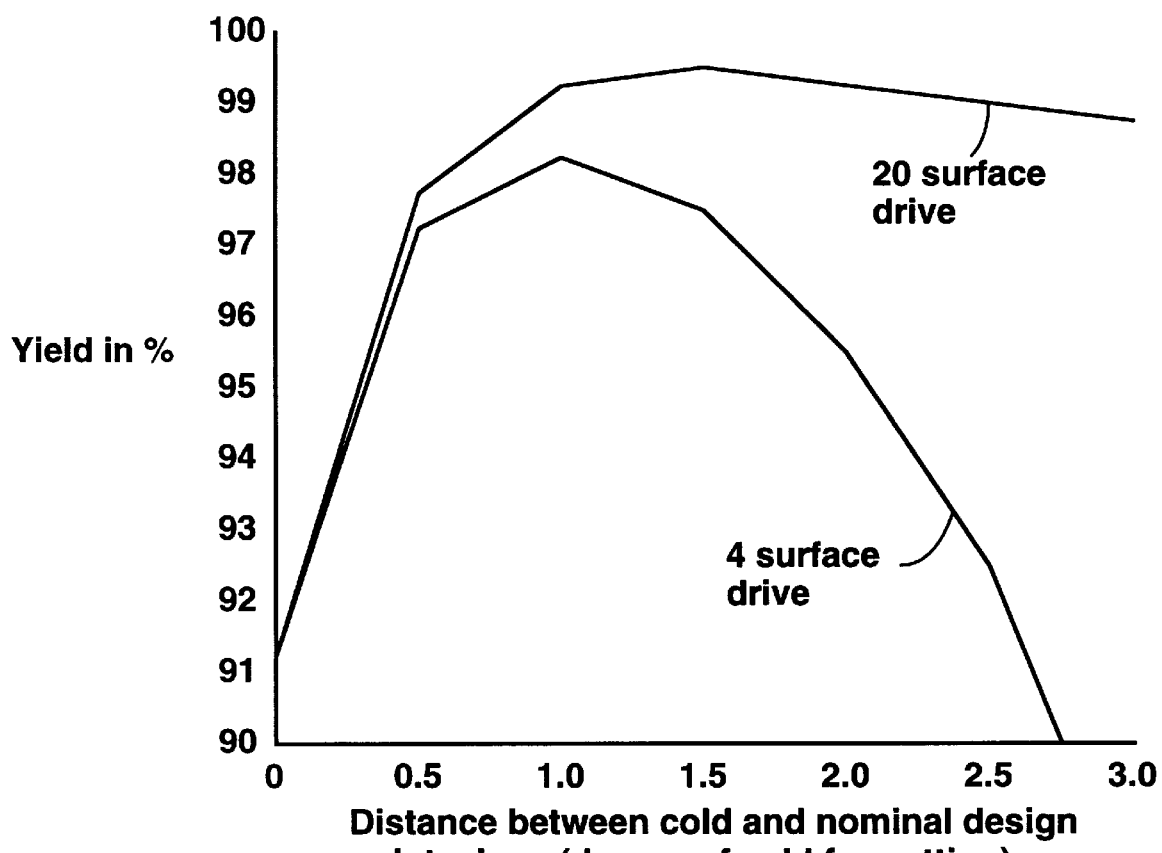
FIG. 13 is a graph of yield versus degree of cold formatting for cold/warm formatted drives.

FIG. 13 shows the yield improvement for cold/warm adaptively formatted 20 and 4 surface drives versus cold and warm data loads (i.e., different amounts of data transfer). The drives have 1 cold and 19 warm surfaces, or 1 cold and 3 warm surfaces. The different cold data loads are expressed in terms of the standard deviation $\sigma$ of the probability distribution of the curve of FIG. 12, and the nominal data load 30. A large $\sigma$ indicates that the cold surface has a relatively low data load, and that the warm surfaces must hold more data. It can be seen that, in the particular case of a 4 surface is drive, the cold data load should be less than the nominal data load by about $1.0\sigma$ for maximum yield.

It is noted that the location of the nominal data load with respect to the mean is an important parameter which affects these calculations. For 20 surface drives, the nominal data load is given to be about $2.6\sigma$ from the mean and for 4 surface drives, the nominal data load is given to be about $2.0\Sigma$ from the mean. These different nominal data loads result in the same yield (about 90%) for 4 and 20 surface nominally formatted drives. The nominal data load merely provides a reference point for convenient calculations.

For a 20 surface drive with 1 cold surface and 19 warm surfaces, the above equation becomes:

$$Y = 20(P_{cw})(P_w)^{19} + P_w^{20}$$

Figure 14:
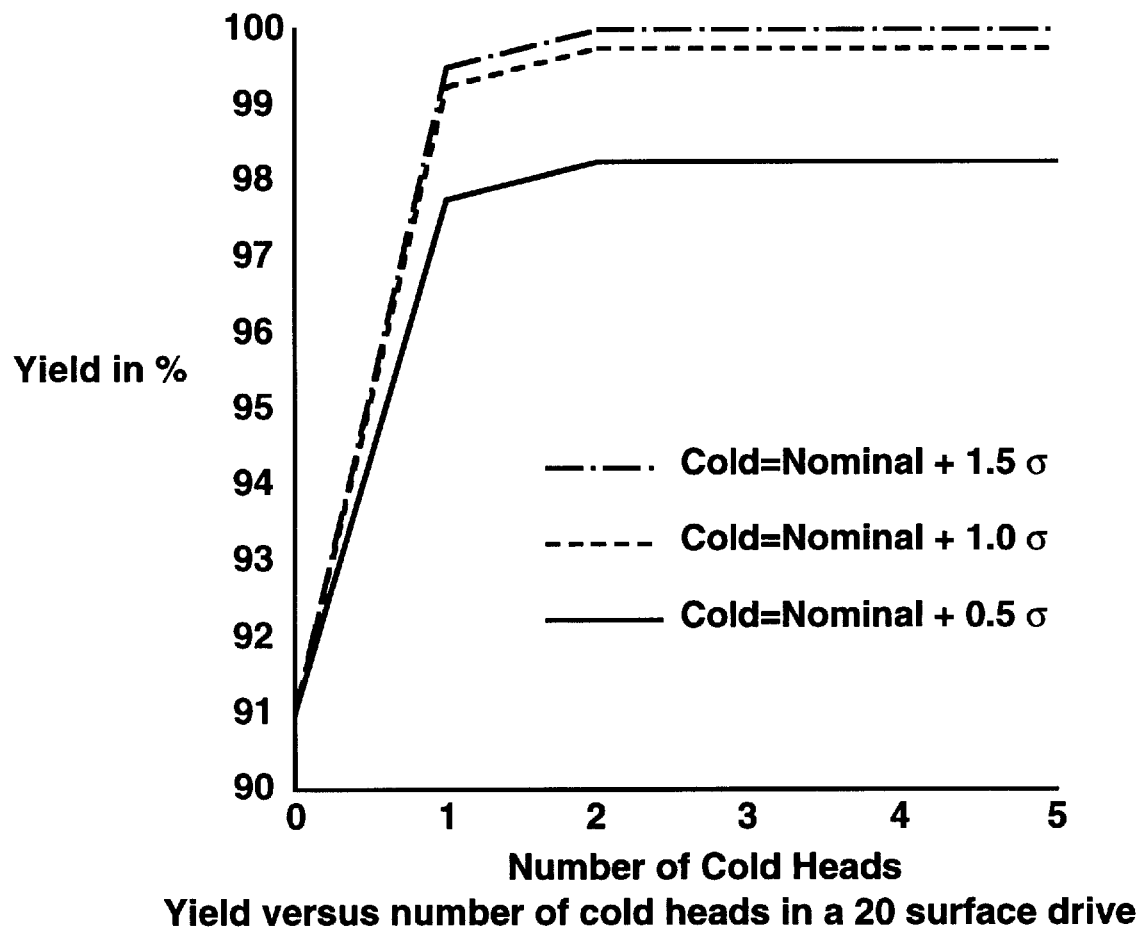
FIG. 14 is a graph of yield versus number of cold surfaces for cold/warm formatted drives.

FIG. 14 shows the yield improvement for cold/warm adaptively formatted 20-surface drives with different numbers of cold surfaces. The three lines indicate three different cold data load 50 data loads. The different cold data loads are expressed in terms of the standard deviation $\sigma$ of the probability distribution of the curve of FIG. 12, and the nominal data load 30. It can be easily seen that a single cold surface provides a large yield improvement and that additional cold surfaces provide diminishing yield improvements. It is noted that the yield for zero cold surfaces (about 91%) is the yield for nominally formatted drives.

In the cold/nominal/hot formatting embodiment, the data load on the cold and hot surfaces is preferably selected such that that manufacturing yield of the drives is maximized. The optimum amount of data load on the cold and hot surfaces will depend upon the bell curve shape of FIG. 3, the nominal data load 30 and the total number of surfaces N in the drive. Adaptive formatting can be thought of as 'data transfer' from the cold to hot surfaces. For a particular group of drives, there exists an optimum amount of data transfer which results in a maximized manufacturing yield. The amount of data transfer in a particular drive is determined by the cold and hot formatting. If too much data is transferred from the cold to hot surfaces, then the hot surfaces have an increased chance of failure which outweighs the decreased chance of failure by the cold surfaces. Conversely, if too little data is transferred, then the cold surfaces are still likely to fail, and little benefit is achieved. In between these two extremes there exists an optimum amount of data transfer, which is expressed as a percentage of the data load of a nominally formatted surface. Preferably, the cold and hot surfaces are formatted such that the manufacturing yield of a group of cold/nominal/hot drives is maximized.

Figure 15:
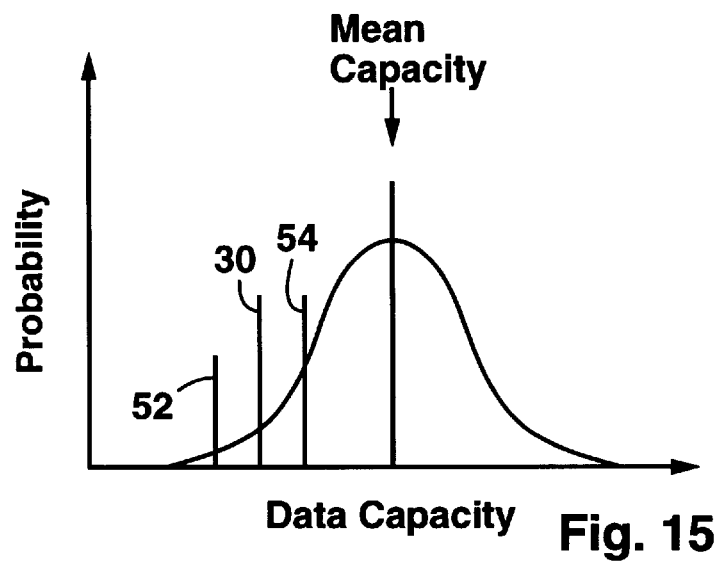
FIG. 15 is a data capacity probability distribution showing the cold data load, nominal data load, and hot data load.

FIG. 15 shows a theoretical capacity probability distribution curve for data surfaces. The cold data load 52, nominal data load 30 and hot data load 54 divide the probability distribution curve into four regions. The total yield for the cold/nominal/hot embodiment cannot be easily written in closed form. The following table is a list of the first few entries in a combinatorical list of all the different possibilities that exist when formatting a N-surface drive according to a cold/nominal/hot format.

| $N_{hot}$ | $N_{nom}$ | $N_{cold}$ | $N_{fail}$ | Number of ways this can happen | Probability of occurence |
|---|---|---|---|---|---|
| N | 0 | 0 | 0 | [N\|N] | [N\|N]Ph$^N$ |
| N-1 | 0 | 0 | 1 | [N\|N-1] | [N\|N-1] (Ph$^{N-1}$)Pf |
| N-1 | 0 | 1 | 0 | [N\|N-1] | [N\|N-1] (Ph$^{N-1}$)Pc |
| N-1 | 1 | 0 | 0 | [N\|N-1] | [N\|N-1] (Ph$^{N-1}$)Pn |
| N-2 | 0 | 0 | 2 | [N\|N-2] | [N\|N-2] (Ph$^{N-2}$) (Pf$^2$) |
| N-2 | 0 | 1 | 1 | [N\|N-2] [2\|1] | [N\|N-2] [2\|1] (Ph$^{N-2}$)PcPf |
| N-2 | 0 | 2 | 0 | [N\|N-2] | [N\|N-2] (Ph$^{N-2}$) (Pc$^2$) |
| N-2 | 1 | 0 | 1 | [N\|N-2] [2\|1] | [N\|N-2] [2\|1] (Ph$^{N-2}$)PnPf |
| N-2 | 1 | 1 | 0 | [N\|N-2] [2\|1] | [N\|N-2] [2\|1] (Ph$^{N-2}$)PnPc |
| N-2 | 2 | 0 | 0 | [N\|N-2] | [N\|N-2] (Ph$^{N-2}$) (Pn$^2$) |
| N-3 | 0 | 0 | 3 | [N\|N-3] | [N\|N-3] (Ph$^{N-3}$) (Pf$^3$) |
| N-3 | 0 | 1 | 2 | [N\|N-3] [3\|1] | [N\|N-3] [3\|1] (Ph$^{N-3}$)Pc(Pf$^2$) |

Where:
[A\|B] = A!/((A-B)!B!),
Pf = probability of a surface having a capacity less than the cold data load,
Pc = probability of a surface having a capacity between the cold and nominal data loads,
Pn = probability of a surface having a capacity between the nominal and hot data loads,
Ph = probability of a surface having a capacity greater than the hot data load,
N = total number of surfaces,
$N_{fail}$ = number of surfaces with a capacity less than the cold design point,
$N_{cold}$ = number of surfaces with a capacity between the cold design point and the nominal data load,
$N_{nom}$ = number of surfaces with a capacity between the hot data load and the nominal data load, and
$N_{hot}$ = number of surfaces with a capacity greater than the hot design point.

The total yield will be equal to the sum of probabilities (column 6) which satisfy the manufacturing constraints of numbers of cold, nominal and hot surfaces. For example, if a row has $N_{cold}=2$, but the drive is formatted with only one cold surface, then the drive for this particular case will fail and the corresponding probability is subtracted from the yield. A nonzero entry in $N_{fail}$ (column 4) necessarily results in a failed drive, so the corresponding column 6 probability will necessarily be subtracted from the yield. Cold/nominal/hot formatted drives provide great yield improvements when a single surface is formatted cold and a single surface is formatted hot. Additional cold and hot surfaces provide diminishing returns.

This combinatrical calculation method will allow one skilled in the art of statistical quality control and mathematics to calculate the manufacturing yield for a given choice of formats, and therefore the optimum amount of data transfer (between cold and hot surfaces) to achieve maximum manufacturing yield for a particular group of drives. The data load on the cold and hot surfaces can then be adjusted by adjusting the cold and hot formats such that the manufacturing yield is maximized for a particular group of drives. Also, the above calculation method will enable one to calculate the data loads on cold and hot surfaces to minimize the chance of failure of an individual drive.

Traversal of drive surfaces is an important consideration in drive performance. Traversal is the act of moving the read/write heads and electronically multiplexing the heads such that all the tracks on all the surfaces of a drive are read consecutively. Typically, each track has a customer block address and traversal is performed from the lowest block address to the highest. Traversing the drive should minimize the number of head movements and the number of data rate switches in order to minimize the access time.

The ensuing drawings show efficient traversal trajectories (sequence in which the data tracks are read) which can be used on drives adaptively formatted according to the present invention.

Figure 16:
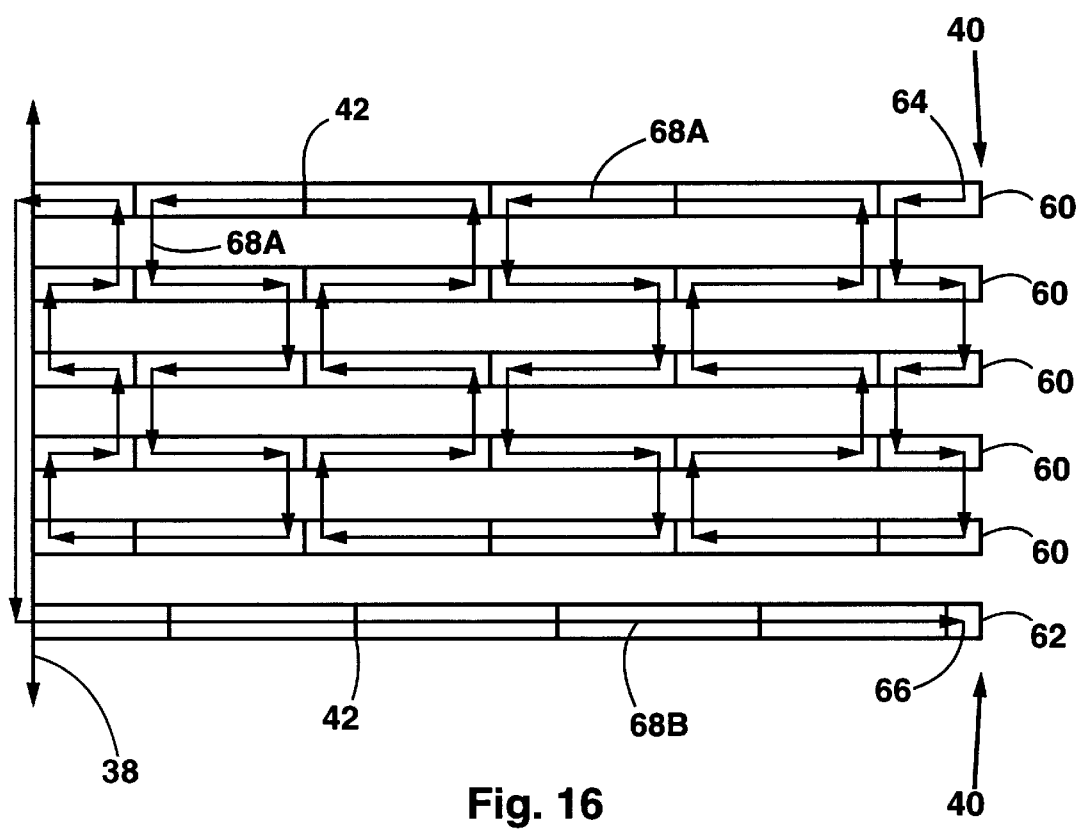
FIG. 16 shows a traversal method which uses zone access mode and radial access mode traversal on a drive with one cold surface.

FIG. 16 shows a method of traversing the surfaces of a drive formatted according to the first embodiment of the present invention. The surfaces of FIG. 16 are formatted with five warm surfaces 60, and one cold surface 62. The warm and cold surfaces have different zone layouts.

The five warm surfaces 60 are traversed using the known method of zone access mode traversal. Zone access mode traversal scans one entire zone on each surface and then moves to the corresponding zone on the next surface. Since the zone boundaries of the cold formatted surface 62 are different, the cold formatted surface cannot be included in the zone access mode trajectory of the warm surfaces 60. The last cold surface 62 is appended at the end of the traversal, and is read in radial access mode. Radial access mode starts at either the innermost or outermost radius and traverses outward or inward across all the zones. Arrow 68B indicates the radial access mode traversal of the cold surface 62. In the embodiment of FIG. 16, the radial access mode traversal starts at the innermost radius and ends at the outermost radius. Start 64 and finish 66 points are labeled and arrows 68A, 68B indicate the trajectory. Radial access mode traversal 68B of a single surface can be considered to be equivalent to zone access mode traversal of a single surface. Since in the preferred embodiment of the present invention there is only one cold formatted surface (and all the others are formatted identically), and most drives have an even number of surfaces, performing the radial access mode traversal does not require any back-tracking of the head which reads the cold surface. It can be seen that some backtracking will be required in most cases where the total number of surfaces in the drive is an odd number. It is noted that the physical location of the cold surface is immaterial because the portions of the trajectory which change surfaces are accomplished by electronic head switches which require no mechanical motion and very little electronic processing. Much more electronic processing is required to travel across zone boundaries 42.

Figure 17:
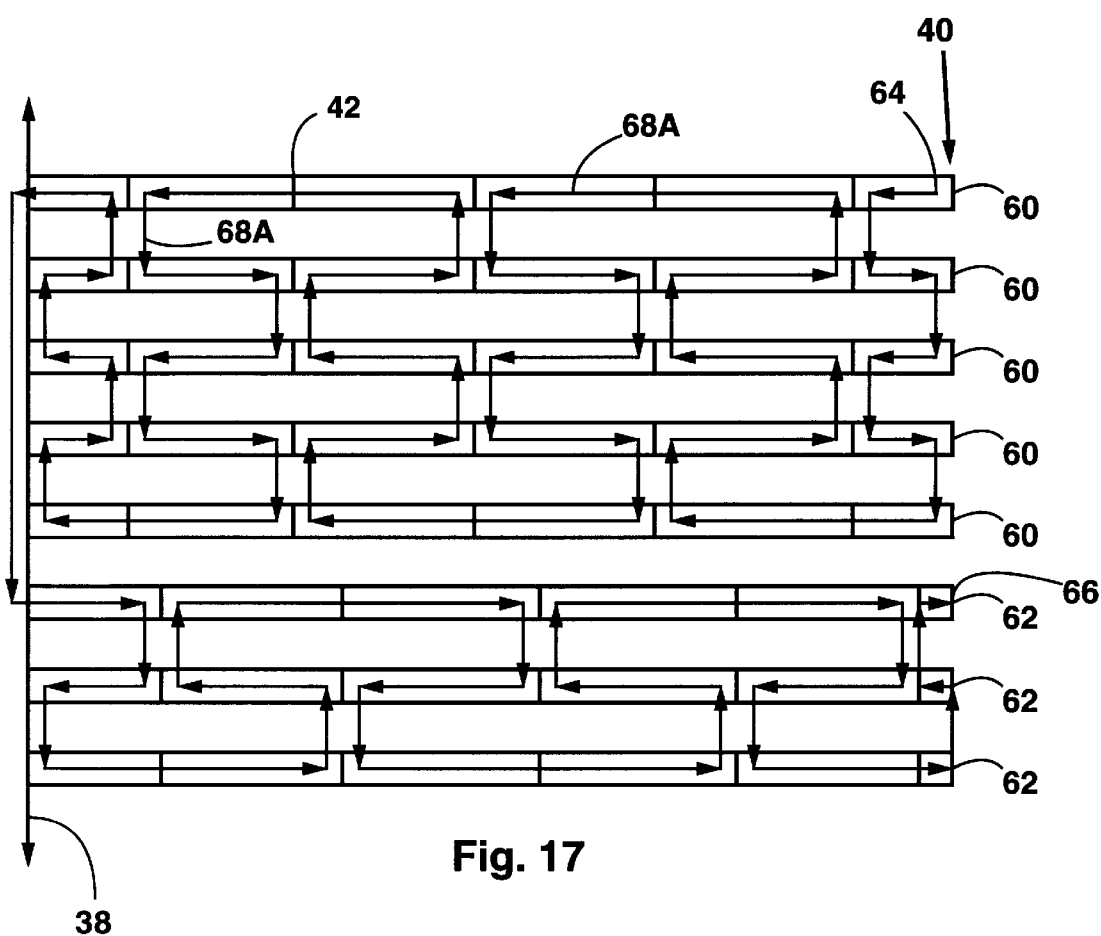
FIG. 17 shows a traversal method which uses zone access mode traversal, wherein the drive has 3 cold surfaces.

Zone access mode traversal can also be applied to drives with two or more cold formatted surfaces. This is illustrated in FIG. 17, where the traversal for a drive with three cold surfaces 62 is shown. In a drive with an even number of cold surfaces, a single cold surface may need to be traversed using radial access mode.

It is noted that zone access mode traversal cannot be used on an even number of surfaces due to the large number of backtracking steps required.

Figure 18:
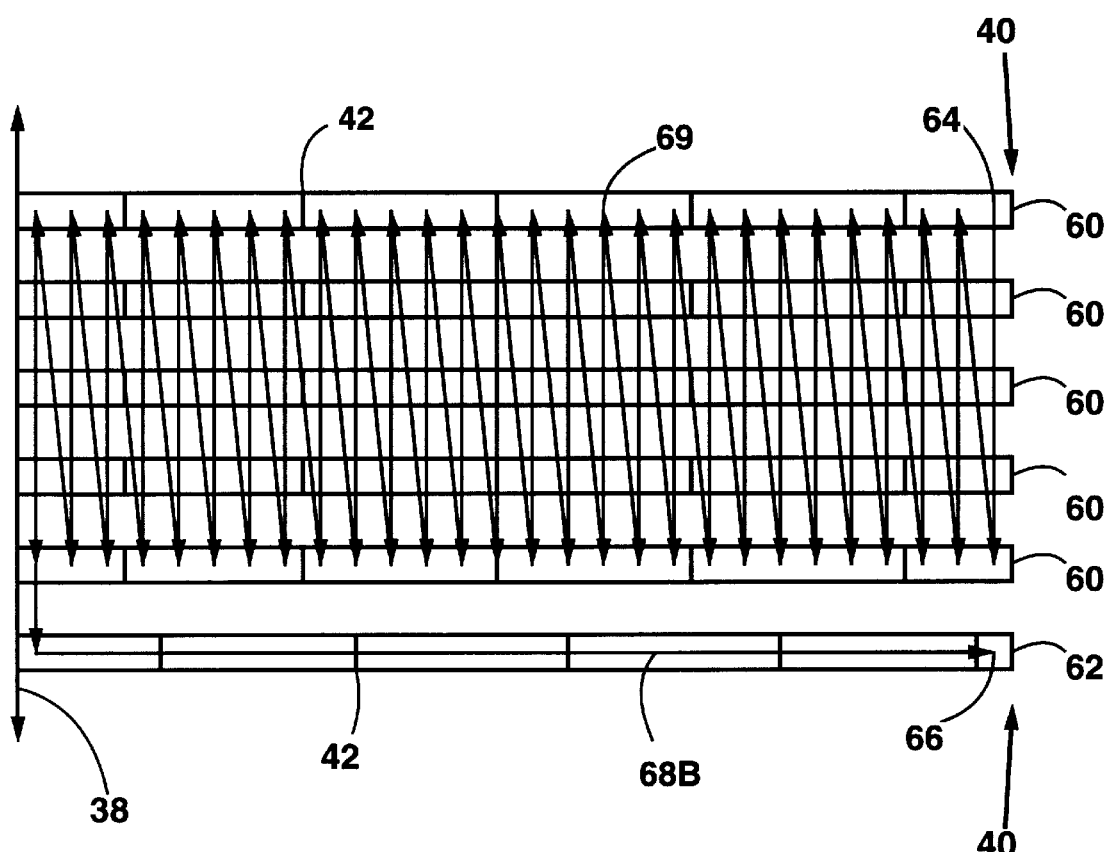
FIG. 18 shows a traversal method which uses cylinder access mode and radial access mode traversal on a drive with one cold surface.

The preferred method of traversal uses an adaptation of the well known cylinder access mode traversal. In cylinder access mode, data is read from corresponding tracks on all the surfaces before moving all the heads to the next track. FIG. 18 shows cylinder access mode traversal being used on five warm surfaces 60. Arrows 69 indicate the scanning path of cylinder access mode. The single cold surface 62 is traversed using radial access mode 68B, as in FIG. 16. Radial access mode traversal of a single surface can be thought of as equivalent to cylinder access mode of a single surface.

Figure 19:
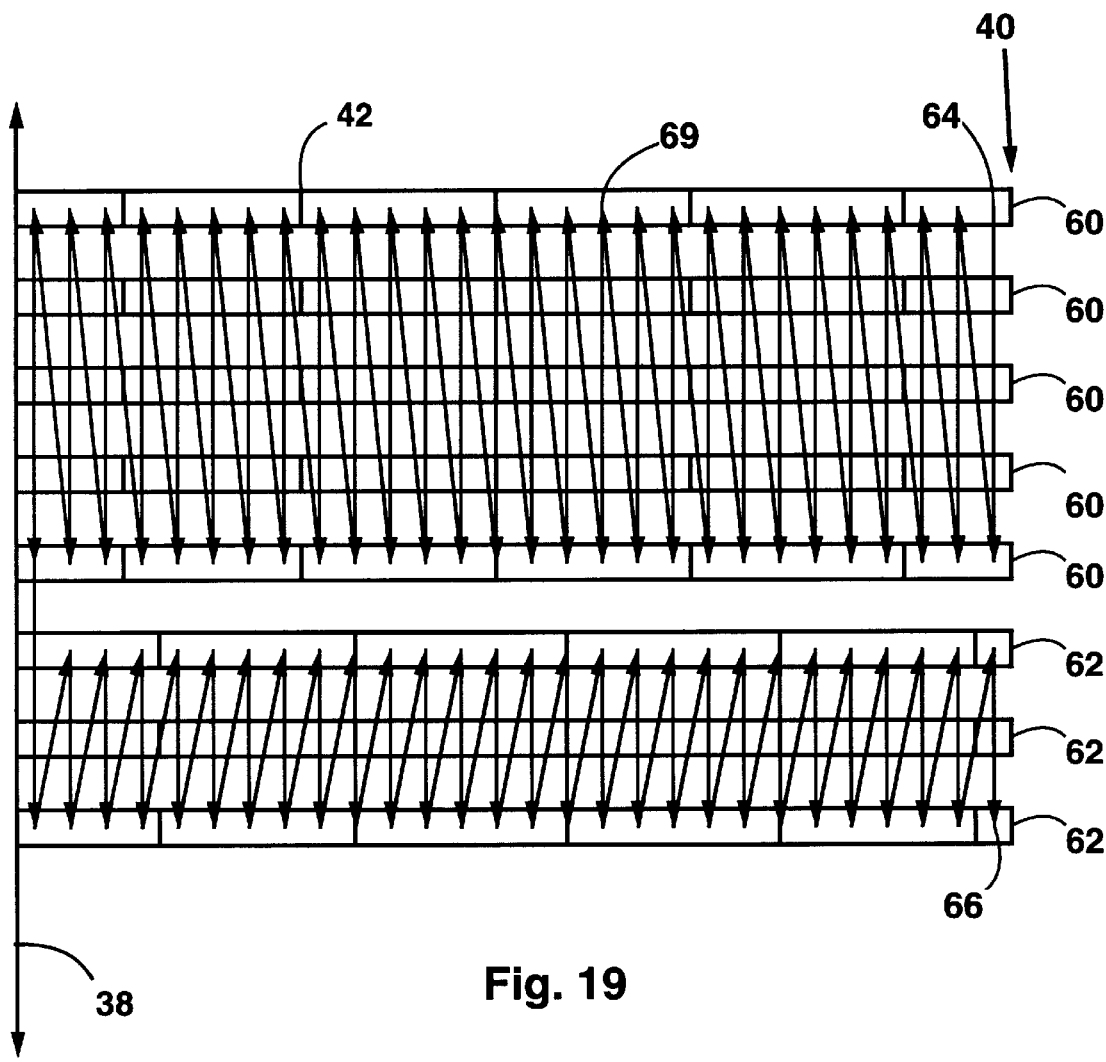
FIG. 19 shows a traversal method which uses cylinder access mode traversal on a drive with 3 cold surfaces.

Cylinder access mode can also be performed on drives with two or more cold surfaces. This is illustrated in FIG. 19. It is obvious that any number of cold surfaces can be traversed by using cylinder access mode. It is noted that the physical location of the cold surfaces within the drive does not have an effect upon the traversal. For example, it does not matter if the cold heads are interleaved with warm heads inside the drive. This is because in a typical drive all the heads move in unison. Also, logical head mapping can be used to group the heads as desired.

Figure 20:
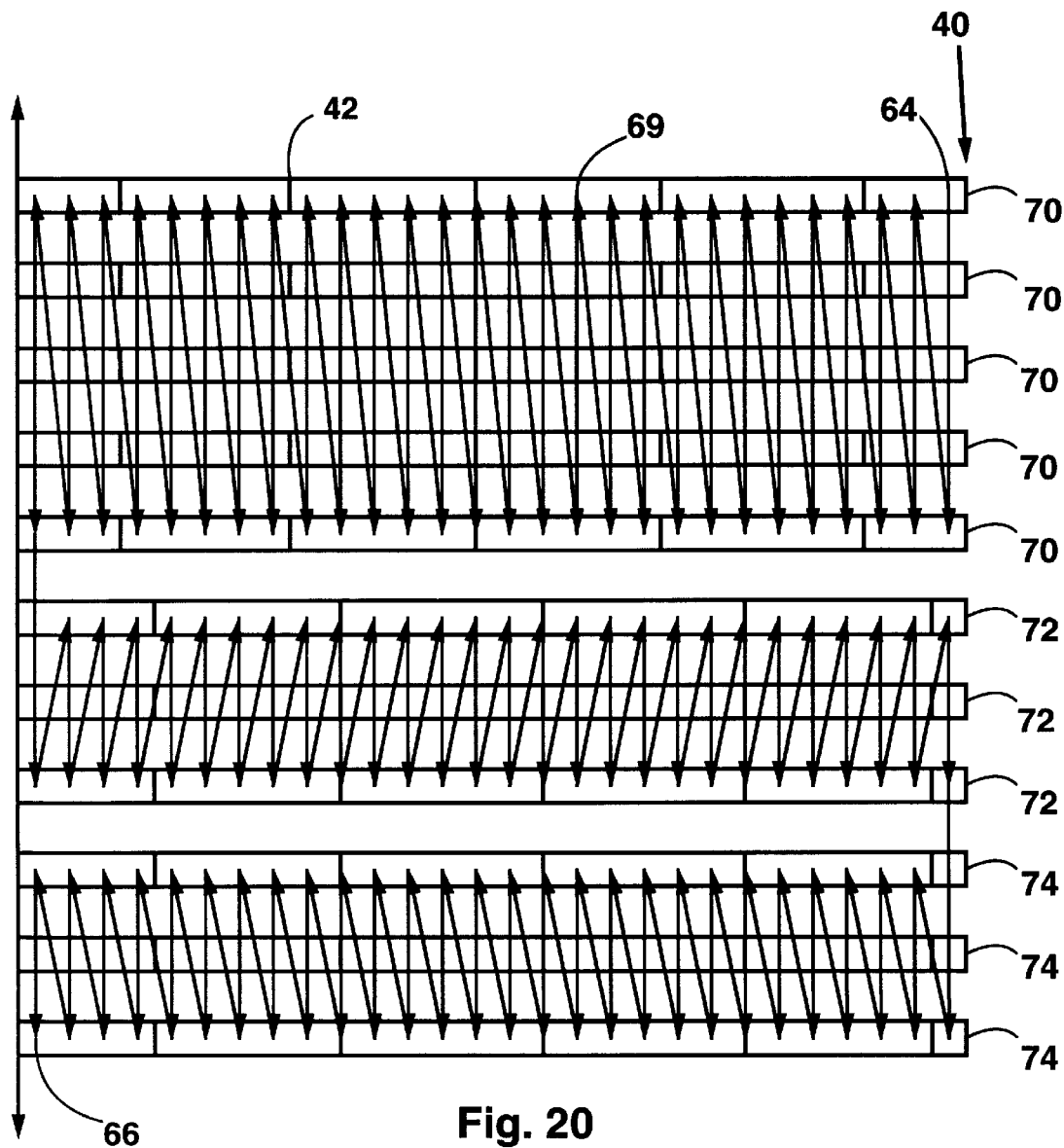
FIG. 20 shows a traversal method which uses cylinder access mode traversal on a drive with 3 cold, 3 hot, and 5 nominal surfaces.

From the drawing of FIG. 19 it is obvious that cylinder access mode traversal is applicable to drives adaptively formatted with three types of zone layouts (hot, nominal, and cold). In this case, each group of like-formatted surfaces is read together. This is illustrated in FIG. 20, nominal surfaces are labeled 70, cold surfaces are labeled 72, and hot surfaces are labeled 74.

It is noted that if the drive is formatted with one hot surface and one cold surface, then it is best to traverse the hot and cold formatted surfaces with two radial access mode traversals: one for each hot and cold surface. The nominal surfaces can be traversed with either cylinder access mode or zone access mode traversal A drive formatted according to the present invention using variable track pitch can be traversed using the same methods as disclosed above for traversing variable zone layout drives. All like-formatted surfaces are traversed using zone access mode or cylinder access mode. Uniquely formatted surfaces are traversed using radial access mode. This is because a variable track pitch drive will have slightly offset zone boundaries on the differently formatted surfaces.

It is noted that surfaces formatted with different track pitch layouts cannot be traversed in a single cylinder access mode traversal because tracks on the different surfaces would not be directly overlapping.

A drive formatted according to the present invention using variable ECC bytes per data block will not need a revised traversal scheme. Such a drive can be traversed using well known methods of traversing nominally formatted drives.

Figure 21:
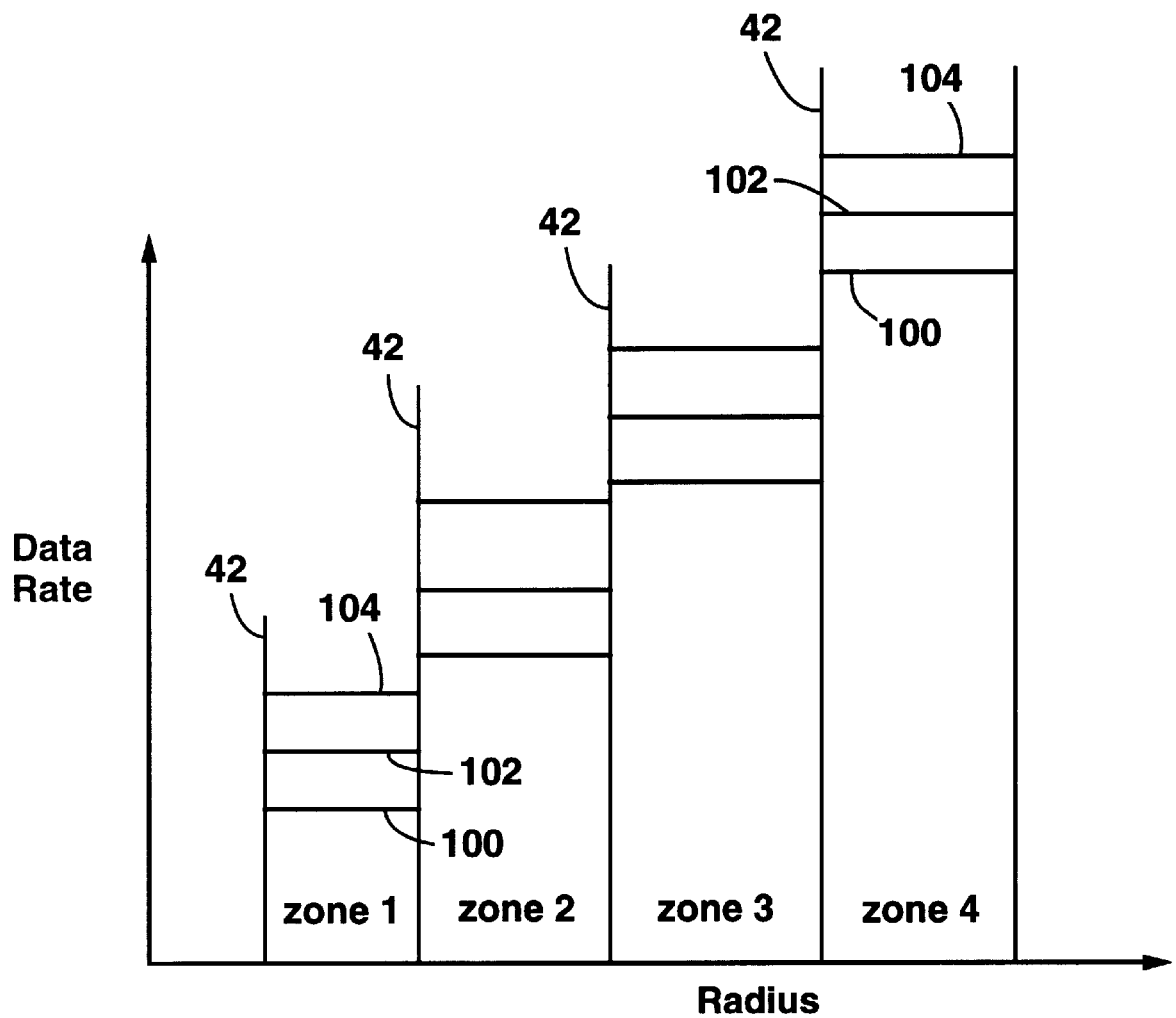
FIG. 21 shows a diagram illustrating the data rates on cold, nominal and hot surfaces formatted with a cold data rate layout, a nominal data rate layout and a hot data rate layout, respectively

It is noted that the traversal methods of the present invention can apply to drives formatted with varying data rates. FIG. 21 shows the data rates on cold, nominal and hot surfaces which are adaptively formatted with different data rates. The cold, nominal and hot surfaces are formatted with a cold data rate layout, a nominal dta rate layout and a hot data rate layout. The cold data rates 100 are less than the nominal data rates 102 which are less than the hot data rates 104 in each zone. The zone boundaries 42 for all the surfaces are in the same locations; only the data rates differ. A cold surface formatted according to the cold data rate layout has a relatively low data rate in each zone and a hot surface formatted according to a hot data rate layout has a relatively high data rate in each zone. The data rates in each zone can be adjusted by varying the linear bit density on the tracks. It is known in the art of drive formatting how to vary the linear bit density on a track.

A drive that is adaptively formatted with varying data rates can be traversed using the same techniques shown for traversing a drive that is adaptively formatted with varying zone boundary layout.

For example, a cold/warm drive with a single cold surface can be traversed by zone access mode traversal of the warm surfaces combined with a radial access mode for the single cold surface. Also, a cold/warm drive with a single cold surface can be traversed by cylinder access mode traversal of the warm surfaces combined with a radial access mode traversal for the single cold surface.

Also for example, a cold/nominal/hot drive with single cold and hot surfaces can be traversed by zone access mode traversal of the nominal surfaces combined with a radial access mode traversal of the cold surface and a radial access mode traversal of the hot surface. Also, a cold/nominal/hot drive with single cold and hot surfaces can be traversed by cylinder access mode traversal of the nominal surfaces combined with a radial access mode traversal for the cold surface and a radial access mode traversal of the hot surface. Multiple cold and hot surfaces can be traversed together using zone access mode or cylinder access mode.

To summarize, all like-formatted surfaces can be traversed together using zone access mode or cylinder access mode. Uniquely formatted surfaces (such as a single cold surfce in a cold/warm drive) can be traversed using radial access mode.

It will be clear to one skilled in the art that the above embodiment may be altered in many ways without departing from the scope of the invention. Accordingly, the scope of the invention should be determined by the following claims and their legal equivalents.

What is claimed is:

1. A data storage device having a predetermined total data capacity and a predetermined data capacity in each data rate, the data storage device comprising:

a) N data surfaces, with K of the N data surfaces formatted according to a cold format thereby defining a cold data load and N−K of the N data surfaces formatted according to a warm format thereby defining a warm data load, where N and K are integers, wherein the cold data load is lower than the warm data load, and wherein the cold data load and the warm data load are selected such that the probability of surface failure is substantially minimized for the predetermined total data capacity.

2. The data storage device of claim 1 wherein K=1 and wherein the following quantity is substantially maximized:

$$N(P_{cw})(P_w)^{(N-1)} + P_w^N,$$

where $P_w$ is the probability that a data surface has a theoretical data capacity greater than a warm data load and $P_{cw}$ is the probability that a data surface has a theoretical data capacity between a cold data load and the warm data load.

3. The data storage device of claim 1 wherein the predetermined total data capacity is equal to the total data capacity of N nominally formatted data surfaces.

4. The data storage device of claim 1 wherein the predetermined data capacity in each data rate is equal to the data capacity in each data rate of N nominally formatted data surfaces.

5. A data storage device having a predetermined total data capacity and a predetermined data capacity in each data rate, the data storage device comprising:

a) N data surfaces, with X of the N data surfaces formatted according to a hot format thereby defining a hot data load, K of the N data surfaces formatted according to a cold format thereby defining a cold data load and N−K−X of the N data surfaces formatted according to a nominal format thereby defining, a nominal data load, where N, X and K are integers, wherein the hot data load is higher than the nominal data load, and the cold data load is lower than the nominal data load, and wherein the hot data load, the cold data load, and the nominal data load arc selected such that the probability of surface failure is substantially minimized for the predetermined total data capacity.

6. The data storage device of claim 5 wherein K=X.

7. The data storage device of claim 5 wherein K=X=1.

8. The data storage device of claim 5 wherein the predetermined total data capacity is equal to the total data capacity of N nominally formatted data surfaces.

9. The data storage device of claim 5 wherein the predetermined data capacity in each data rate is equal to the data capacity in each data rate of N nominally formatted data surfaces.

10. A method for formatting a plurality of data storage devices, wherein each storage device comprises N data surfaces, where N≧2, each data surface comprises a plurality of data zones, and each data zone has a predetermined data rate, the method comprising the steps of:

a) measuring a figure-of-merit for each data surface, the figure-of-merit corresponding to a maximum theoretical data capacity of each data surface;

b) identifying at least one cold data surface in each storage device, the cold data surfaces having the lowest theoretical data capacity as measured by the figure-of-merit, wherein each storage device has the same number of cold data surfaces identified;

c) identifying as warm data surfaces all remaining data surfaces not identified as cold data surfaces;

d) formatting the cold data surfaces according to a predetermined cold format;

e) formatting the warm data surfaces according to a predetermined warm format;

whereby each storage device has the same total data capacity and the same data capacity in each data rate.

11. The method of claim 10 wherein step (b) comprises identifying exactly one cold surface.

12. The method of claim 10 wherein the total data capacity of each storage device is equal to the total data capacity of N nominally formatted data surfaces.

13. The method of claim 10 wherein the capacity in each data rate of each storage device is equal to the capacity in each data rate of N nominally formatted data surfaces.

14. The method of claim 10 wherein the cold format and the warm format are selected such that manufacturing yield is substantially maximized.

15. The method of claim 10 wherein the cold format is selected from a group consisting of a cold zone layout, a cold error correction code layout, and a cold track pitch layout.

16. The method of claim 10 wherein the warm format is selected from a group consisting of a warm zone layout, a warm error correction code layout, and a warm track pitch layout.

17. A method for formatting a plurality of data storage devices, wherein each storage device comprises N data surfaces, where N≧2, each data surface comprises a plurality of data zones, and each data zone has a predetermined data rate, the method comprising the steps of:

a) measuring a figure-of-merit for each data surface, the figure-of-merit corresponding to a maximum theoretical data capacity of each data surface;

b) identifying at least one hot data surface in each storage device, the hot data surface having the highest theoretical data capacity as measured by the figure-of-merit, wherein each storage device has the same number of hot data surfaces identified;

c) identifying at least one cold data surface in each storage device, the cold data surface having the lowest theoretical data capacity as measured by the figure-of-merit, wherein each storage device has the same number of cold data surfaces identified;

d) identifying as nominal data surfaces all remaining data surfaces not identified as hot or cold data surfaces;

e) formatting the hot data surfaces according to a predetermined hot format;

f) formatting the cold data surfaces according to a predetermined cold format;

g) formatting the nominal data surfaces according to a predetermined nominal format;

whereby each storage device has the same total data capacity and the same data capacity in each data rate.

18. The method of claim 17 wherein the number of hot surfaces is equal to the number of cold surfaces such that the total data capacity of each the storage device is equal to the total data capacity of N nominally formatted data surfaces.

19. The method of claim 17 wherein step (b) comprises identifying exactly one hot surface, and step (c) comprises identifying exactly one cold surface.

20. The method of claim 17 wherein the total data capacity of each storage device is equal to the total data capacity of N nominally formatted data surfaces.

21. The method of claim 17 wherein the capacity in each data rate of each storage device is equal to the capacity in each data rate of N nominally formatted data surfaces.

22. The method of claim 17 wherein the cold format and the hot format are selected such that manufacturing yield is substantially maximized.

23. The method of claim 17 wherein the cold format is selected from a group consisting of a cold zone layout, a cold error correction code layout, and a cold track pitch layout.

24. The method of claim 17 wherein the hot format is selected from a group consisting of a hot zone layout, a hot error correction code layout, and a hot track pitch layout.

25. A method of traversing data surfaces in a data storage device comprising a total of N data surfaces with N–K warm data surfaces formatted according to a warm format, and K cold data surfaces formatted according to a cold format, where N and K are integers, wherein the warm format defines a warm data load and the cold format defines a cold data load, wherein the warm data load is higher than the cold data load, the method comprising the steps of:

a) traversing all the warm data surfaces according to cylinder access mode traversal;

b) traversing all the cold data surfaces according to cylinder access mode traversal;

wherein the cold format is selected from a group consisting of a cold zone layout, a cold track pitch layout, and a cold data rate layout, and wherein the warm format is selected from a group consisting of a warm zone layout, a warm track pitch layout, and a warm data rate layout.

26. The method of claim 25 wherein K=1 and step (b) is equivalent to a radial access mode traversal.

27. A method of traversing data surfaces in a data storage device comprising a total of N data surfaces with N–K warm data surfaces formatted according to a warm format, and K cold data surfaces formatted according to a cold format, where N and K are integers, wherein the warm format defines a warm data load and the cold format defines a cold data load, wherein the warm data load is higher than the cold data load, the method comprising the steps of:

a) traversing all the warm data surfaces according to zone access mode traversal;

b) traversing all the cold data surfaces according to zone access mode traversal;

wherein the cold format is selected from a group consisting of a cold zone layout, a cold track pitch layout, and a cold data rate layout, and wherein the warm format is selected from a group consisting of a warm zone layout, a warm track pitch layout, and a warm data rate layout.

28. The method of claim 27 wherein K=1 and step (b) is equivalent to a radial access mode traversal.

29. A method of traversing a data storage device comprising a total of N data surfaces with X hot data surfaces formatted according to a hot format, K cold data surfaces formatted according to a cold format, and N–K–X nominal data surfaces formatted according to a nominal format, where N, K and X are integers, wherein the hot format defines a hot data load, the cold format defines a cold data load, and the nominal format defines a nominal data load, wherein the hot data load is higher than the nominal data load and the cold data load is lower than the nominal data load, the method comprising the steps of:

a) traversing all the hot data surfaces according to cylinder access mode traversal;

b) traversing all the cold data surfaces according to cylinder access mode traversal;

c) traversing all the nominal data surfaces according to cylinder access mode traversal;

wherein the cold format is selected from a group consisting of a cold zone layout, a cold track pitch layout, and a cold data rate layout, and wherein the hot format is selected from a group consisting of a hot zone layout, a hot track pitch layout, and a hot data rate layout.

30. The method of claim 29 wherein X=1 and step (a) is equivalent to a radial access mode traversal.

31. The method of claim 29 wherein K=1 and step (b) is equivalent to a radial access mode traversal.

32. A method of traversing a data storage device comprising a total of N data surfaces, X hot data surfaces formatted according to a hot format, K cold data surfaces formatted according to a cold format, and N–K–X nominal data surfaces formatted according to a nominal format, wherein N, K and X are integers, wherein the hot format defines a hot data load, the cold format defines a cold data load, and the nominal format defines a nominal data load, wherein the hot data load is higher than the nominal data load and the cold data load is lower than the nominal data load, the method comprising the steps of:

a) traversing all the hot data surfaces according to zone access mode traversal;

b) traversing all the cold data surfaces according to zone access mode traversal;

c) traversing all the nominal data surfaces according to zone access mode traversal;

wherein the cold format is selected from a group consisting of a cold zone layout, a cold track pitch layout, and a cold data rate layout, and wherein the hot format is selected from a group consisting of a hot zone layout, a hot track pitch layout, and a hot data rate layout.

33. The method of claim 32 wherein X=1 and step (a) is equivalent to a radial access mode traversal.

34. The method of claim 32 wherein K=1 and step (b) is equivalent to a radial access mode traversal.

* * * * *